(12) United States Patent
Dowling et al.

(10) Patent No.: US 8,223,897 B2
(45) Date of Patent: Jul. 17, 2012

(54) COMPACT PULSE SHAPING FOR QM-MSK AND PAM/QAM RECEPTION

(76) Inventors: Eric Morgan Dowling, Escazu (CR); John P. Fonseka, Plano, TX (US)

( * ) Notice: Subject to any disclaimer, the term of this patent is extended or adjusted under 35 U.S.C. 154(b) by 376 days.

(21) Appl. No.: 12/656,476

(22) Filed: Feb. 1, 2010

(65) Prior Publication Data

US 2011/0188613 A1 Aug. 4, 2011

(51) Int. Cl.
*H04L 27/06* (2006.01)
(52) U.S. Cl. ............... 375/341; 375/265; 714/796
(58) Field of Classification Search .......... 375/262, 375/265, 341
See application file for complete search history.

(56) References Cited

U.S. PATENT DOCUMENTS

| | | | |
|---|---|---|---|
| 5,916,315 | A | 6/1999 | Ryan |
| 7,532,676 | B2 | 5/2009 | Fonseka et al. |
| 7,609,614 | B2 | 10/2009 | Fonseka et al. |
| 2008/0118002 | A1 | 5/2008 | Dowling et al. |

OTHER PUBLICATIONS

Sundberg, "Continuous Phase Modulation," IEEE Communications Magazine, Apr. 1986, pp. 25-38.
Campenalla et al., "Optimum Bandwidth-Distance Performance in Partial Response CPM Systems," IEEE Transactions on Communications, vol. 44, No. 2, Feb. 1996, pp. 148-151.
Aulin et al., "Continuous Phase Modulation—Part II: Partial Response Signaling," IEEE Transactions on Communications, vol. COM-29, No. 3, Mar. 1981, pp. 210-225.
Fonseka et al, "Quadrature Multiplexed CPM," IEEE Transactions on Communications, vol. 56, No. 9, Sep. 2008, pp. 1487-1497.
Charab Langton, "Partial Response Signaling and Quadrature Partial Response(QPR) Modulation," Signal Processing and Simulation Newsletter, 2002.
M. Honig, "Baseband Signaling and Pulse Shaping.", 1999.
Kudson et al, "Dynamic Threshold Implementation of Maximum-Likelihood Detection for the EPR4 Channel," pp. 2135-2139, Globecom 1991.
H. Shaffiee et al, "Signal Space Detectors for MTR-Coded Magnetic Recording Channels," IEEE Transactions on magnetics, pp. 141-146, vol. 34, No. 1, Jan. 1998.
Rayan et al., A CMOS Equiripple-Phase Low-Pass Filter for PRML Applications, pp. 194-197, ISPLC 2000.

*Primary Examiner* — Kevin Kim
(74) *Attorney, Agent, or Firm* — Eric M. Dowling

(57) ABSTRACT

Compact pulse shape partial response (CPS PR) signaling is developed for trellis based signals like QM-MSK, and for PAM/QAM type signals to improve the performance to bandwidth tradeoff. Compact pulse shaped signals are partial response signals that employ a very short pulse shaping filter and use Viterbi decoding to optimally detect the CPS signal in presence of its inherent inter-symbol interference. The CPS filters considered herein have much shorter impulse response than the well-known raised cosine (RC) filter. There is no need to equalize the received signal to eliminate ISI or to allow a fixed amount of ISI between received signal samples as sampled at the symbol rate as is common in partial response maximum likelihood (PRML) systems. Numerical results indicate that CPS QM-MSK and CPS QAM provides between several dB of gain, depending on constellation size, over PR-CPM and RC QAM, when compared at a given value of bandwidth, i.e., $B_{99}T_b$.

29 Claims, 14 Drawing Sheets

| $L$ | $\alpha$ | $d_{min}^2$ | $B_{99}T_b$ | $N_R$ | PAPR |
|---|---|---|---|---|---|
| 1 | 1/8 | 2 | 0.52 | 4 | 1.94 |
| 2 | 1/4 | 1.56 | 0.39 | 40 | 2.55 |
| 2 | ½ | 1.75 | 0.42 | 14 | 2.38 |
| 2 | 7/8 | 2.0 | 0.47 | 9 | 2.12 |
| 3 | ½ | 1.03 | 0.31 | 14 | 3.23 |
| 3 | 3/2 | 1.52 | 0.39 | 27 | 2.52 |
| 4 | 11/8 | 0.90 | 0.28 | 23 | 3.41 |
| 4 | 3/2 | 0.94 | 0.29 | 27 | 3.32 |

FIG. 4

| M | L | Number of States | $\alpha$ | $d_{min}^2$ | $B_{99}T_b$ | PAPR |
|---|---|---|---|---|---|---|
| 4 | 1 | 16 | 1/8 | 0.80 | 0.26 | 3.49 |
| 8 | 1 | 64 | 1/8 | 0.286 | 0.173 | 4.53 |
| 4 | 2 | 64 | 1/4 | 0.62 | 0.195 | 4.59 |
| 4 | 2 | 64 | ½ | 0.70 | 0.21 | 4.28 |
| 4 | 2 | 64 | 7/8 | 0.80 | 0.235 | 3.82 |

FIG. 5

| QAM Type | $d_{min}^2$ | $B_{99}T_b$ | PAPR | Observation Window |
|---|---|---|---|---|
| QPSK | 2.0 | 0.60 | 2.6 | 40T |
| 16-QAM | 0.8 | 0.30 | 4.68 | 40T |
| 32-QAM | 0.5 | 0.24 | 2.06 | 40T |
| 64-QAM | 0.286 | 0.20 | 6.07 | 40T |
| 128-QAM | 0.171 | 0.17 | 6.72 | 40T |

FIG. 6

| $L$ | $\alpha$ | $d_{min}^2$ | $B_{99}T_b$ | $N_R$ | PAPR |
|---|---|---|---|---|---|
| 1 | 0 | 2 | 0.663 | 2 | 1.5 |
| 2 | 3/8 | 2 | 0.458 | 8 | 2.06 |
| 3 | 3/4 | 1.33 | 0.380 | 20 | 2.71 |
| 3 | 5/4 | 1.66 | 0.403 | 27 | 2.36 |
| 3 | 3/2 | 1.82 | 0.430 | 12 | 2.24 |
| 4 | 13/8 | 1.10 | 0.313 | 21 | 3.12 |

FIG. 8

| M | L | Number of States | $\alpha$ | $d_{min}^2$ | $B_{99}T_s$ | PAPR |
|---|---|---|---|---|---|---|
| 4 | 1 | 4 | 0 | 0.80 | 0.335 | 2.70 |
| 8 | 1 | 8 | 0 | 0.286 | 0.223 | 3.50 |
| 4 | 2 | 16 | 3/8 | 0.80 | 0.229 | 3.71 |
| 8 | 2 | 64 | 3/8 | 0.286 | 0.153 | 4.81 |
| 4 | 3 | 64 | 3/4 | 0.53 | 0.19 | 4.88 |
| 4 | 3 | 64 | 5/4 | 0.66 | 0.20 | 4.25 |
| 4 | 3 | 64 | 3/2 | 0.73 | 0.215 | 4.03 |

FIG. 9

| Constellation | $L$ | Number of States | $\alpha$ | $d_{min}^2$ | $N_R$ | $B_{99}T_b$ | PAPR |
|---|---|---|---|---|---|---|---|
| 32CR | 1 | 6 | 0 | 0.5 | 2 | 0.265 | 2.55 |
| 32CR | 2 | 36 | 3/8 | 0.5 | 8 | 0.183 | 3.50 |
| 32CR | 3 | 216 | 3/4 | 0.333 | 20 | 0.152 | 4.60 |
| 32CR | 3 | 216 | 5/4 | 0.415 | 27 | 0.161 | 4.01 |
| 128CR | 1 | 12 | 0 | 0.171 | 2 | 0.189 | 3.70 |
| 128CR | 2 | 144 | 3/8 | 0.171 | 8 | 0.131 | 5.07 |

FIG. 10

COMPACT PULSE SHAPING FOR QM-MSK AND PAM/QAM RECEPTION

BACKGROUND OF THE INVENTION

1. Field of the Invention

This invention relates generally to communication transmitters, receivers, and systems. More particularly, the invention relates modulation schemes that use pulse shaping filters with compact support in order to improve performance in a constrained bandwidth.

2. Description of the Related Art

It is known that continuous phase modulation (CPM) has superior spectral roll-off compared with linear modulation formats due to the phase continuity of the signals. Many different forms of CPM including, full and partial response CPM, multi-h and multi-T CPM formats, convolutional and trellis coded CPM, and nonlinear CPM have been discussed in the literature to improve the performance/bandwidth tradeoff of CPM signals.

In U.S. Pat. No. 7,532,676, a class of quadrature multiplexed continuous phase modulation (QM-CPM) signals that can reduce the already narrow bandwidth of regular CPM signals in half without sacrificing performance, has been introduced. The U.S. Pat. No. 7,532,676 is incorporated herein by reference. This patent provide further details on the generation of QM-CPM signals the component baseband message signals used in the generation of QM-CPM baseband signals. The QM-CPM signals are generated using a complex to real transformation on regular CPM signals. A simple transformation is used to extract two independent real signals from two independent CPM baseband signals, and then the two independent real signals are transmitted simultaneously on the two quadrature channels, generating a QM-CPM signal. The transformation considered in U.S. Pat. No. 7,532,676 to generate a real signal, m(t), from a regular CPM signal, $m_{reg}(t) = Ae^{j\alpha(t)}$, that is $$m(t) = Re\{m_{reg}(t)\} = A \cos \alpha(t) \quad (1)$$

where A is the signal amplitude and $\alpha(t)$ is the phase variation of the regular CPM signal. It is known that m(t) has a finite state structure that can be derived from a real component of $m_{reg}(t)$ signals, which themselves are constant-amplitude complex signals whose phase follows a phase trellis. A QM-CPM signal, s(t), is then formed by two independent m(t) variations, $m_1(t) = Re\{Ae^{j\alpha_1(t)}\}$ and $m_2(t) = Re\{Ae^{j\alpha_2(t)}\}$, where $\alpha_1(t)$ and $\alpha_2(t)$ correspond to two independent CPM phase functions generated by respective individual message sequences.

A low pass equivalent of a QM-MSK signal is given by:

$$s(t) = m_1(t) + jm_2(t - \tau_{I,Q}). \quad (2)$$

Equation (2) is a lowpass equivalent of a bandpass signal where the real and imaginary parts of (2) are modulated onto quadrature sine/cosine carriers at a given carrier frequency. The component signals of QM-CPM, $m_1(t)$ and $m_2(t)$, which are essentially time varying pulse amplitude modulated (PAM) signals are referred to as CPM-PAM signals herein. The delay $\tau_{I,Q}$ in (2) is a relative time shift between the two CPM-PAM signals selected to minimize the PAPR value. It has been shown that QM-CPM signals can significantly improve the performance/bandwidth tradeoff of regular CPM signals. However, the performance gain is achieved at the expense of the constant envelope of CPM signals but with reasonably low peak to average power ratio (PAPR) values. For example, when the component regular CPM signals, $m_{reg,1}(t)$ and $m_{reg,2}(t)$, are minimum shift keying (MSK) signals, the PAPR of the resulting QM-MSK signals can be made equal to 1.707 with a time shift $\tau_{I,Q} = T/2$. The QM-CPM signals can be decoded by Viterbi decoding the two component CPM-PAM signals independently on I and Q channels.

Partial response CPM (PR-CPM) signaling has been used to improve the performance/bandwidth tradeoff of regular CPM signals. In PR-CPM, the effect of each symbol is spread over a pre-selected number of intervals L by selecting a baseband pulse of length LT. This is done using pre-filtering by passing the message through a pulse shaping filter prior to CPM modulation. Many different shapes of baseband pulses have been studied with PR-CPM in the literature.

It would be desirable to apply partial response signaling to improve the performance of QM-MSK signals. While one might consider generating partial response QM-CPM (PR-QM-CPM) by using a PR-CPM signal for $m_{reg}(t)$ in (1), it was found that this method does not generate PR-QM-CPM signals with attractive performance/bandwidth properties. Hence, it would be desirable to develop new ways to generate PR-CPM signals to overcome these problems. In regular PR-CPM, filtering is performed prior to modulation. It would be desirable to develop a PR-QM-CPM signaling scheme where a different type of filtering is performed after the QM-CPM modulation, i.e., after the $m_1(t)$ signal is formed as per (1) as opposed to being applied to $\alpha(t)$ as is done in the PR CPM art. It would be desirable to have methods and apparatus for signal generation, transmission, reception and detection/decoding of PR-QM-MSK signals.

Also, in linear baseband pulse amplitude modulation (PAM), that transmits symbols at the rate 1/T symbols/sec, Nyquist filtering is known to reduce the required bandwidth to 1/2T (or 1/T for two-sided carrier-PAM) while eliminating intersymbol interference (ISI) caused by the filtering. While Nyquist filtering limits the spreading in the frequency domain, it generates an infinitely long impulse response in the time domain that follows a sinc variation (where sinc (x) = $(\sin(\pi x))/\pi x$). Raised cosine (RC) and square root raised cosine type filtering are more practical because they taper off the sinc variations faster so that a finite length impulse response filter can be used. However, RC signaling expands the bandwidth to a value $(1+\beta)/2T$, where $\beta$ is called the roll-off factor. In such systems, the RC filter is often chosen so that the ISI equals zero at discrete sampling points spaced apart by T seconds, i.e., when sampled at the symbol rate, 1/T. Stated another way, with RC filtering, a received signal will be pre-processed so that upon sampling, a signal $\hat{x}(kT+\Delta)$ will be have all the ISI removed from it at the sampling times.

U.S. Pat. No. 5,916,315 is an example of another type of signaling scheme known as Partial Response Maximum Likelihood (PRML). In PRML processing, a PAM type data sequence is passed through a discrete time finite impulse response (FIR) filter or a channel that follows an FIR channel model. The FIR filtered data sequence is then passed through a square root RC filter. At the receiver, the received signal is passed through another square root RC filter. After the RC filtering (equalization) at the receiver, the received signal is sampled at the symbol rate, 1/T. With this choice of RC filtering, a controlled amount of intersymbol interference is left in the received and sampled signal. The received and sampled signal is known follow a fixed relationship at the discrete sampling points when sampled at a sampling rate $F_s = 1/T$. For example, a PR2 channel model is defined by $y(t) = 0.5 \cdot x(t-2T) + x(t-T) + 0.5x(t)$, or $H(D) = 0.5D^2 + D + 0.5$. Instead of trying to use an RC filter to remove this ISI, a Viterbi decoder is used to determine the most likely transmitted PAM sequence given the observations of the sampled signal, y(kT+Δ), where k is a discrete time index and Δ is a timing variable used in symbol timing recovery.

It would be desirable to develop Compact Pulse Shaping (CPS) filters to provide a CPS PAM/QAM signaling schemes without the need for RC equalization with longer RC filters at the receiver. It would be desirable for the CPS filter to have a relatively narrow bandwidth and to use subsequent digital processing to relax the need to cause zero intersymbol interference or a fixed relationship of intersymbol interference to exist at discrete sampling points of the received signal, y(t), i.e., at y(kT+Δ), where y(t) is sampled version of the received signal when sampled at a sampling rate $F_s=1/T$ after being received through a communication channel.

It would be desirable to develop Viterbi decoder based receivers to optimally detect the CPS PAM/QAM signals in presence of the controlled amount of intersymbol interference (ISI) introduced by the CPS filter.

SUMMARY OF THE INVENTION

A first aspect of the invention involves transmitter methods and apparatus to produce a communication signal for transmission of a binary data sequence via a channel to a communication receiver. The apparatus and method generate a first real-valued baseband message signal ($m_1(t)$ signal) that follows a first trajectory through an amplitude trellis. The $m_1(t)$ signal is transformed into a first compact pulse shape encoded partial response (CPS PR) signal, e.g., given by $$x_I(t) = \sum_{j=1}^{L+1} p_{Q_{(k-j+1)}, Q_{(k-j+2)}}(t - kT + jT - T),$$

where t is preferably a discrete time variable clocked multiple times per symbol interval, $kT \leq t < (k+1)T$, with $L \leq 7$. Here $p_{Q_{(k-j+1)}, Q_{(k-j+2)}}(t) = m_{Q_{(k-j+1)}, Q_{(k-j+2)}}(t) \otimes h(t)$ is a compact pulse shape no longer than (L+1)T, $m_{Q_{(k-j+1)}, Q_{(k-j+2)}}(t)$ is a state transition signal of the $m_1(t)$ signal from a state Q(k−j+1) to a state Q(k−j+2), h(t) is a finite impulse response filter whose impulse response has a length no longer than LT, and j is an integer. The $x_I(t)$ signal is then processed to generate the communication signal. The h(t) is not designed to cause zero intersymbol interference or a fixed relationship of intersymbol interference to exist at discrete sampling points of a received and sampled version of the communication signal ($\hat{x}_I(kT+Δ)$ signal) as observed in the receiver prior to any subsequent trellis decoding. The variable Δ is an optional receiver variable selectable in the receiver to compensate a time shift introduced between the transmitter and receiver.

A second aspect of the invention involves transmitter methods and apparatus to produce a communication signal for transmission of a binary data sequence via a channel to a communication receiver. The binary data sequence is transformed into a compact pulse shape (CPS) encoded partial response signal, ($x_I(t)$ signal) wherein $$x_I(t) = \sum_{j=1}^{L+1} I_{k-j+1} p(t - kT + jT - T)$$

for a collection of values of t as discussed above, where $L \leq 7$, and $a_k$ is an M-ary pulse amplitude modulated sequence representative of the binary data sequence, with $M \geq 2$. Here $p(t) = z(t) \otimes h(t)$ is a compact pulse shape whose length is no longer than (L+1)T, z(t) is a baseband pulse shape with a pulse width that is no longer than T, and h(t) that is selected as discussed above. The $x_I(t)$ signal is then processed to generate the communication signal therefrom. Again, h(t) is not designed to cause zero intersymbol interference or a fixed relationship of intersymbol interference to exist at discrete sampling points of a received and sampled version of the communication signal ($\hat{x}_I(kT+Δ)$ signal).

A third aspect of the present invention centers around communications receiver methods and apparatus adapted to process a received communication signal that is a channel-distorted version of a communication signal as discussed above. For example, the communication signal may be encoded with at least an in-phase component signal ($x_I(t)$ signal), given by $$x_I(t) = \sum_{j=1}^{L+1} p_{Q_{(k-j+1)}, Q_{(k-j+2)}}(t - kT + jT - T),$$

where t is an oversampled discrete time variable, preferably $L \leq 7$, $p_{Q_{(k-j+1)}, Q_{(k-j+2)}}(t) = m_{Q_{(k-j+1)}, Q_{(k-j+2)}}(t) \otimes h(t)$ is a compact pulse shape whose length is no longer than (L+1)T, and h(t) is selected as discussed above. Here $m_{Q_{(k-j+1)}, Q_{(k-j+2)}}(t)$ is a state transition signal of a first real-valued baseband message signal ($m_1(t)$ signal) from a state Q(k−j+1) to a state Q(k−j+2), the $m_1(t)$ signal follows a first trajectory through an amplitude trellis in accordance with a binary data sequence that has been trellis encoded therein, and the first trajectory passes through a first particular sequence of trellis states, $Q_0, Q_1, \ldots Q_k$, at discrete times, kT. The received communication signal is receive from a channel, at least an in-phase baseband component signal ($Z_I(t)$ signal) is extracted therefrom, lowpass filtered, and oversampled at an oversampling rate $F_s=OS/T$, where $2 \leq OS \leq 8$ is an oversampling factor, and the ADC provides OS voltage samples for the $k^{th}$ symbol interval. During the $k^{th}$ symbol interval, a $k^{th}$ set of the oversampled data samples of the $Z_I(t)$ signal are used to compute a $k^{th}$ set of branch metrics. Each branch metric provides a measure of a respective distance between the $k^{th}$ set of the oversampled data samples and a respective one of a set of template state transition signals ($x_{Template}(t, S_k, S_{k+1})$ signals) representative of each possible state transition from each possible first state $S_k=(Q_{k-1}, Q_{k-2}, \ldots Q_{k-L})$, to each second state $S_{k+1}=(Q_k, Q_{k-1}, \ldots Q_{k-L+1})$, for each next permissible state $Q_k$ that can be transitioned to from the state $Q_{k-1}$. The branch metrics are then used by a trellis decoding algorithm to determine a trellis decoded sequence. The trellis decoded sequence is then inverse-mapped to derive an estimate of the binary data sequence.

A third aspect of the present invention centers around communications receiver methods and apparatus adapted to process a received communication signal that is a channel-distorted version of a communication signal as discussed above. For example, the communication signal may be encoded with at least an in-phase component signal ($x_I(t)$ signal), wherein $$x_I(t) = \sum_{j=1}^{L+1} a_{k-j+1} p(t - kT + jT - T),$$

for at least a two discrete sample times t in each of a plurality of symbol intervals, including a $k^{th}$ symbol interval ($kT \leq t < (k+1)T$), where T is a symbol interval duration, k is an integer counting variable, L is a positive integer and $L \leq 7$. Here $\{a_k\}$ is an M-ary pulse amplitude modulated sequence that has been generated in accordance with a binary data sequence, where M≧2, p(t)=z(t)⊗h(t) is a compact pulse shape whose length is no longer than (L+1)T, z(t) is a baseband pulse shape with a pulse width that is no longer than T, and h(t) is a finite impulse response filter whose impulse response has a length no longer than LT. The received communication signal is received from a channel, and at least an in-phase baseband component signal ($Z_I$(t) signal) is extracted therefrom. Low-pass filtering is applied to produce a $Z_I$(t) signal which is subsequently oversampled at an oversampling rate $F_s$=OS/T, where 2≦OS≦8 is an oversampling factor. During the $k^{th}$ symbol interval, a $k^{th}$ set of the oversampled data samples of $Z_I$(t) are used to compute a $k^{th}$ set of branch metrics. Each branch metric provides a measure of a respective distance between the $k^{th}$ set of the oversampled data samples and a respective one of a set of template state transition signals ($x_{Template}$(t, $S_k$, $S_{k+1}$) signals) representative of each possible state transition from each possible first state $S_k$=($a_{k-1}$, $a_{k-2}$, ... $a_{k-L}$), to each second state $S_{k+1}$=($a_k$, $a_{k-1}$, ... $a_{k-L+1}$), for each next permissible pulse amplitude modulated symbol, $a_k$. A trellis decoding algorithm is then applied using the branch metrics to determine a trellis decoded estimate of the sequence {$a_k$}. An estimate of the binary data sequence is then determined by inverse mapping this trellis decoded sequence onto the original binary data sequence. Various layers of coding may be applied to binary data sequence as is known in the art. The template state transition signal from the first state $S_k$=($a_{k-1}$, $a_{k-2}$, ... $a_{k-L}$) to the second state $S_{k+1}$=($a_k$, $a_{k-1}$, ... $a_{k-L+1}$) can be written as $$x_{Template}(t, S_k, S_{k+1}) = \sum_{j=1}^{L+1} a_{k-j+1} p(t - kT + jT - T),$$

for at least OS discrete sample times t in the $k^{th}$ symbol interval kT≦t<(k+1)T.

BRIEF DESCRIPTION OF THE FIGURES

The various novel features of the present invention are illustrated in the figures listed below and described in the detailed description that follows.

FIG. 4 is a table that lists the properties of attractive CPS PR-QM-MSK schemes that have been constructed using the CPS filter of equation (6).

FIG. 5 is a table that lists the properties of a collection of selected CPS PR-MA-QM-MSK signals that have been constructed using the CPS filter of equation (6).

FIG. 6 is a table that lists the properties of RC filtered QAM signals with 20% roll-off.

FIG. 8 is a table that lists the properties of selected CPS 2-PAM/QPSK signals.

FIG. 9 is a table that lists the properties of selected CPS M-PAM/$M^2$-QAM signals.

FIG. 10 is a table that lists the properties of selected CPS QAM constellations that send an odd number of bits per interval.

DETAILED DESCRIPTION OF THE PREFERRED EMBODIMENTS

U.S. Pat. No. 7,532,676 teaches that any component PAM-MSK signal, m(t) (on I or Q), of a QM-MSK signal is a two state system that employs four different waveforms $m_{i,j}$(t), transitioning from state i to state j (with i,j=1,2), where, $$m_{1,1}(t) = \cos\left(-\frac{\pi}{4} + \frac{\pi t}{2T}\right), \quad m_{1,2}(t) = \cos\left(-\frac{\pi}{4} - \frac{\pi t}{2T}\right) \quad (3)$$

$$m_{2,1}(t) = -m_{1,2}(t), \quad m_{2,2}(t) = -m_{1,1}(t). \quad (4)$$

QM-MSK signals and regular MSK signals have the same normalized squared minimum distance of $d_{min}^2$=2.0, but QM-MSK signals have a spectral variation that is narrower by a factor 2 as compared to regular MSK signals when the spectral variation is normalized to the bit bandwidth. Additionally, U.S. Pat. No. 7,532,676 describes a broader class of QM-CPM signals that have different state structures other than (3)-(4), and the present invention can apply to any such other QM-CPM state structure, or even more generally, to any signal that follows an amplitude trellis. As discussed in the CPS PR PAM/QAM descriptions below, the present invention can also be applied to PAM type signals that do not even follow an amplitude trellis.

Figure 1:
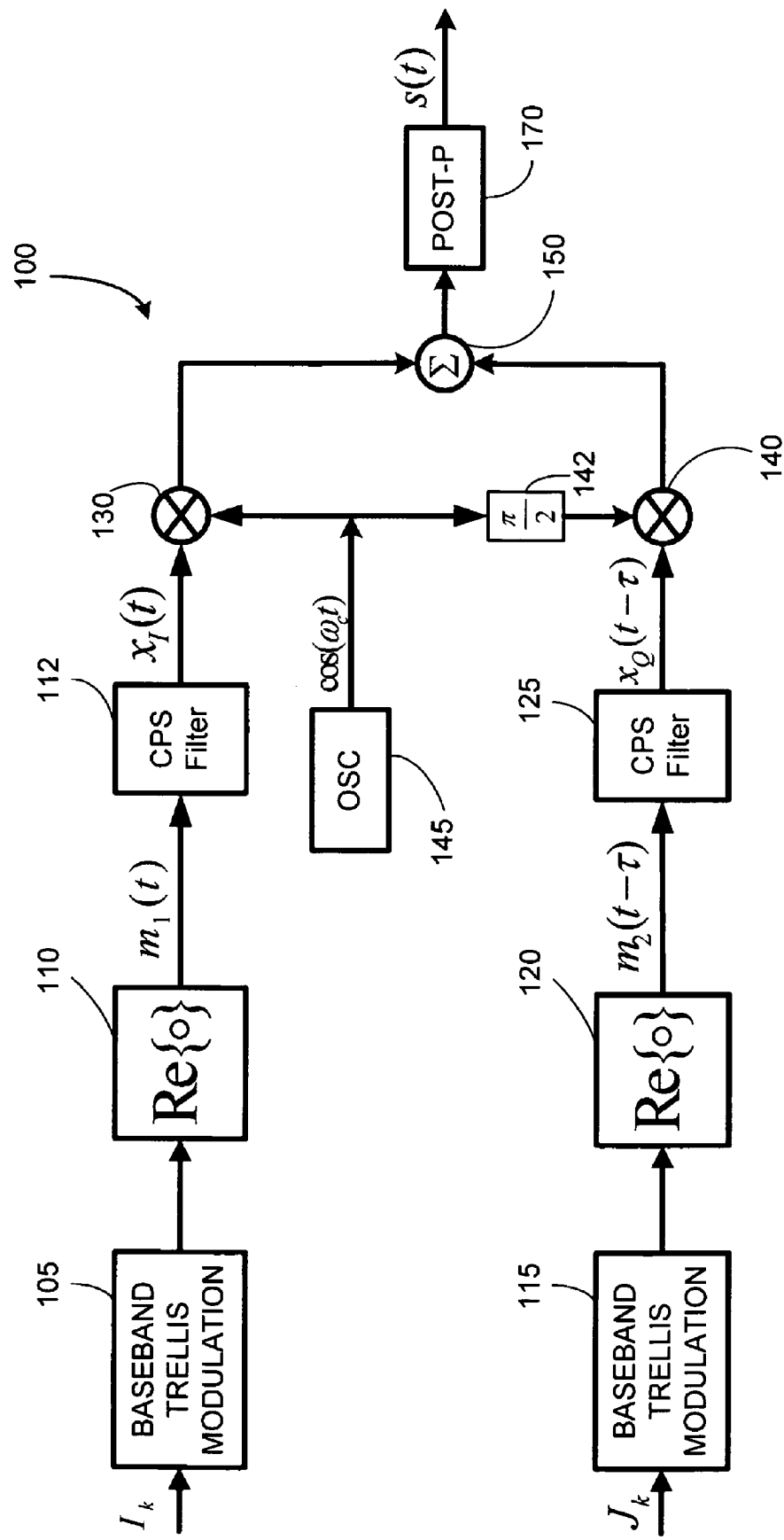
FIG. 1 is a block diagram that illustrates key aspects of a CPS QM-CPM transmitter apparatus and method.

FIG. 1 is a block diagram that illustrates key aspects of a CPS QM-CPM transmitter apparatus. Data sequences $I_k$, $J_k$ are fed to baseband trellis modulation units 105, 115 that preferably implement a CPM baseband modulation such as MSK to produce respective complex-valued baseband signals. The complex-valued baseband signals are then processed 110 120 via a complex-to-real transformation such as retaining just the real parts of the respective complex-valued (e.g., CPM or MSK) baseband signals. The output of the complex-to-real transformations 110 120 are $m_1$(t) and $m_2$(t) as in (2). In the case of QM-MSK, $m_1$(t) and $m_2$(t) will have the state transition structure of (3) and (4). QM-MSK is discussed herein in detail by way of example, but the present invention can be applied to other forms of QM-CPM as well.

In the generation of CPS PR-QM-MSK, the PAM-MSK signals in (3) and (4) are first processed as illustrated in FIG. 1 before quadrature multiplexing. By noting that each m(t) is a continuous PAM signal, its bandwidth can be controlled by passing them through linear compact pulse shaping (CPS) filters 112, 125. As stated before, the CPS filter's impulse response, h(t), is chosen to be restricted to a time duration LT. IN most practical examples studied herein, L≦4, but in some embodiments, practical values of L might go as high as L≦7. Higher values would be possible, especially if simple signaling schemes like binary signaling schemes are used. The power spectral density (psd) of the transmitted signal on each of the I and Q channels, x(t), is given by $$S_x(f) = S_m(f)|H(f)|^2 \qquad (5)$$

where, $S_m(f)$ is the psd of m(t) and |•| denotes the absolute value. As seen from (5), the spectrum of x(t) can be controlled by adjusting h(t) which determines H(f). In a preferred embodiment, the CPS filters 112, 125 have impulse responses h(t) with an adjustable parameter $\alpha = t_0/T$ given by:

$$h(t) = \begin{cases} \frac{1}{2}\left[1 - \cos\left(\frac{\pi(t-t_a)}{t_a}\right)\right], & 0 \le t < t_0 \\ 1, & t_0 \le t < (L-\alpha)T \\ \frac{1}{2}\left[1 + \cos\left(\frac{\pi(t-t_b)}{t_b}\right)\right], & LT - t_0 \le t < LT \\ 0, & \text{otherwise} \end{cases} \qquad (6)$$

where $t_a = \alpha T/2$ and $t_b = (LT - t_a)$. It is noticed that the impulse response in (6) is in the form of a raised cosine filter usually used in the frequency domain with Nyquist type filtering, but is much shorter, e.g., $L \le 4$ or $L \le 7$, and lacks the long $\sin(\pi x)/\pi x$ decay in its impulse response. The Fourier transform of the CPS filter h(t) can be found as:

$$H(f) = \frac{\sin[\pi(L-\alpha)fT]}{\pi(L-\alpha)fT} \frac{\cos(\pi\alpha fT)}{1 - 4f^2\alpha^2 T^2} e^{j\pi fLT}. \qquad (7)$$

Spectral factorizations can be performed, that is, certain embodiments can use square root versions of the pulse shaping filter can be used in the transmitter and receiver to collectively provide the transfer function of (7). Preferred embodiments perform all pulse shaping (7) at the transmitter. Since m(t) has the same spectrum of regular MSK signals and dropping the constants, the QM-MSK spectrum is given by:

$$S_m(f) = \left(\frac{\cos(2\pi fT)}{1 - 16f^2 T^2}\right)^2. \qquad (8)$$

Therefore, the psd of the CPS QM-MSK signal x(t) follows from (5), (7) and (8) as:

$$S_x(f) = \left(\frac{\cos(2\pi fT)}{1 - 16f^2 T^2}\right)^2 \left(\frac{\sin[\pi(L-\alpha)fT]}{\pi(L-\alpha)fT}\right)^2 \left(\frac{\cos(\pi\alpha fT)}{1 - 4f^2\alpha^2 T^2}\right)^2. \qquad (9)$$

The transmitted-signal spectrum, $S_x(f)$, can be well controlled by adjusting L and $\alpha$. As indicated by FIGS. 4-6, compared with QM-MSK, schemes with much better spectral variations with faster spectral roll-offs can be found.

Figure 3:
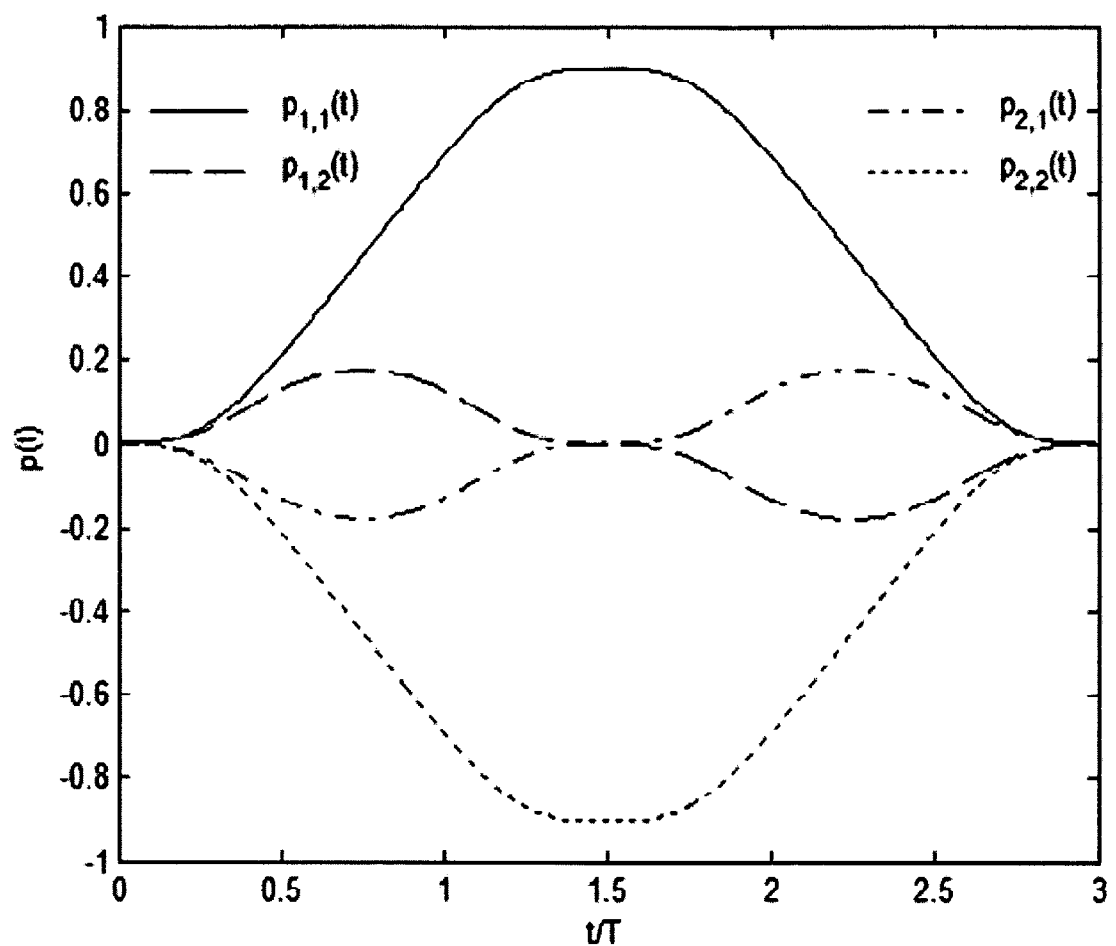
FIG. 3 illustrates the variations of CPS QM-MSK state transition signals $p_{i,j}$(t) corresponding to the $m_{i,j}$(t) of equations (3)-(4) when the CPS filter (6) is selected with L=2 and α=1/2.

Since, $p_{i,j}(t) = m_{i,j}(t) \otimes h(t)$ (where $\otimes$ denotes linear convolution), the pulse shaping filter stretches out the input waveforms $m_{i,j}(t)$. FIG. 3 illustrates the variations of $p_{i,j}(t)$ signals corresponding to the $m_{i,j}(t)$ signals shown in FIG. 3 when L=2 and $\alpha$=1/2. It is seen in FIG. 3 that during every interval a waveform that extends up to three (in general (L+1)) intervals is selected for transmission. Hence, the variation of the transmitted signal x(t) during any interval depends not just on the signal $p_{i,j}(t)$ generated at the beginning of that intervals but also on the $p_{i,j}(t)$ signals generated during two (in general L) previous intervals. Hence, the transmitted signal $x_f(t)$ during any k th interval, $kT \le t < (k+1)T$, can be written as:

$$x_I(t) = \sum_{j=1}^{L+1} p_{Q_{(k-j+1)}, Q_{(k-j+2)}}(t - kT + jT - T) \qquad (10)$$

where $Q_k$ denotes the state of m(t) during the k th interval. The signals $x_f(t)$ and $x_Q(t-\tau)$ in FIG. 1 are both of the form of (1) where $\tau$ is an optional delay that is selected to reduce the peak to average power ratio of $x_f(t) + jx_Q(t-\tau)$. As shown in FIG. 1, $x_f(t)$ and $x_Q(t-\tau)$ are then quadrature multiplexed 130, 140, 142, 145, 150 onto the I and Q carriers. Any post filtering or post-signal-conditioning such as pre-equalization or otherwise is carried out in the optional post processing module 170. Similarly, an analog reconstruction filter followed by D/A conversion can be implemented as part of blocks 112, 125, or 170, depending on the embodiment.

The average symbol energy of a CPS PR-MSK-PAM signal can be written in terms of the symbol duration T as $$E_{PR-MSK-PAM} = T\overline{x_I^2(t)}. \qquad (11)$$

where $\overline{x^2_I(t)}$ denotes the mean square or the average power of $x_f(t)$. It is seen from (10) that in order to define $x_f(t)$ during any k th interval, it is necessary to know not just the state of $m_1(t)$ during the k th interval, $Q_k$, but also the states of $m_1(t)$ during L prior intervals, $Q_{k-1}, Q_{k-2}, \ldots, Q_{k-L}$. Hence, the state of $x_f(t)$ during any k th interval can be defined as $$S_k = (Q_k, Q_{k-1}, \ldots, Q_{k-L}), \qquad (12)$$

where two paths emerge from every state of the case of QM-MSK. Hence, the number of states of CPS PR-QM-MSK signals increases from 2 of regular QM-MSK signals to $2^{(L+1)}$. Based on the above state structure, CPS PR-QM-MSK signals can be decoded similar to the decoding of QM-MSK signals, using coherent demodulation and Viterbi decoding on $2^{(L+1)}$ states. Also, the $x_Q(t)$ signal is processed the same as the $x_f(t)$ signal, and has the same properties as the $x_f(t)$ signal, but is driven by a separate data sequence, $J_k$, instead of $I_k$.

In operation, a communication transmitter as in FIG. 1 is adapted to produce a communication signal for transmission of a binary data sequence such as $I_k$ via a channel to a communication receiver. An $m_1(t)$ signal that follows a first trajectory through an amplitude trellis is generated, for example, as in (1)-(4) or other trellis based signal generation means. The $m_1(t)$ signal is then transformed into an $x_f(t)$ signal (for example, see FIG. 3 and equation (10)). In equation (10) the variable, t, can be a discrete time variable that usually involves multiple samples per symbol interval, e.g., with an oversampling rate of two to eight times the symbol rate. Equation (10) can then be used to generate the $x_f(t)$ signal. The $x_f(t)$ signal can then be transmitted to a distant end at baseband, possibly after digital-to-analog conversion and reconstruction filtering to form the communication signal. Alternatively, the $x_f(t)$ signal is typically amplitude modulated (e.g., DSB-SC) onto an in-phase carrier and transmitted at passband to form the communication signal. Alternatively, an $x_Q(t)$ signal can be generated using equations (1)-(4) and (10) or similar trellis signal generation means, but whose trellis trajectory is driven by a second binary data sequence, $J_k$. Next $x_f(t)$ signal and the $x_Q(t)$ signal can be quadrature multiplexed 130, 140, 142, 145, 150 to form the communication signal. This quadrature multiplexed communication signal is then transmitted to the receiver via the channel.

The above signals are constructed using an h(t) such a that no receive equalizer (such as an RC filter or square root RC filter) need be used to cause zero intersymbol interference or a fixed relationship of intersymbol interference to exist at discrete sampling points of a received and sampled version of the communication signal, $\hat{x}_I(kT + \Delta)$, as observed in the receiver prior to any subsequent trellis decoding, where $\Delta$ is an optional receiver variable selectable in the receiver to compensate a time shift introduced between the transmitter and receiver. Instead, receiver processing is used where the received version of the communication signal is oversampled and Viterbi decoded as discussed below. Note this is different than PRML where a fixed amount of ISI is allowed to exist between received-signal samples sampled at the symbol rate in the receiver.

In several preferred embodiments, the $m_1(t)$ signal corresponds to $m_1(t) = A \cos(\alpha_1(t))$, where A is a real number and $\alpha_1(t)$ is a continuous phase modulation (CPM) phase function. Other types of embodiments are possible where the $m_1(t)$ signal follows an amplitude trellis but is not derived from a real component of a CPM baseband signal. Similarly, in QM-CPM embodiments, the $m_2(t)$ signal will correspond to $m_2(t)=A \cos(\alpha_2(t))$, where $\alpha_2(t)$ is a second continuous CPM phase function.

In most embodiments, a set of samples of the $x_I(1)$ signal are passed through a digital-to-analog converter (DAC). The DAC is clocked at a clock rate to produce at least two DAC output voltages per symbol interval, $kT \le t < (k+1)T$ The output of the DAC through a reconstruction filter to produce the communication signal. Oversampling rates up to eight times the symbol rate may are common, and the oversampling rate may be selected to optimize the computation to performance tradeoff.

Figure 2:
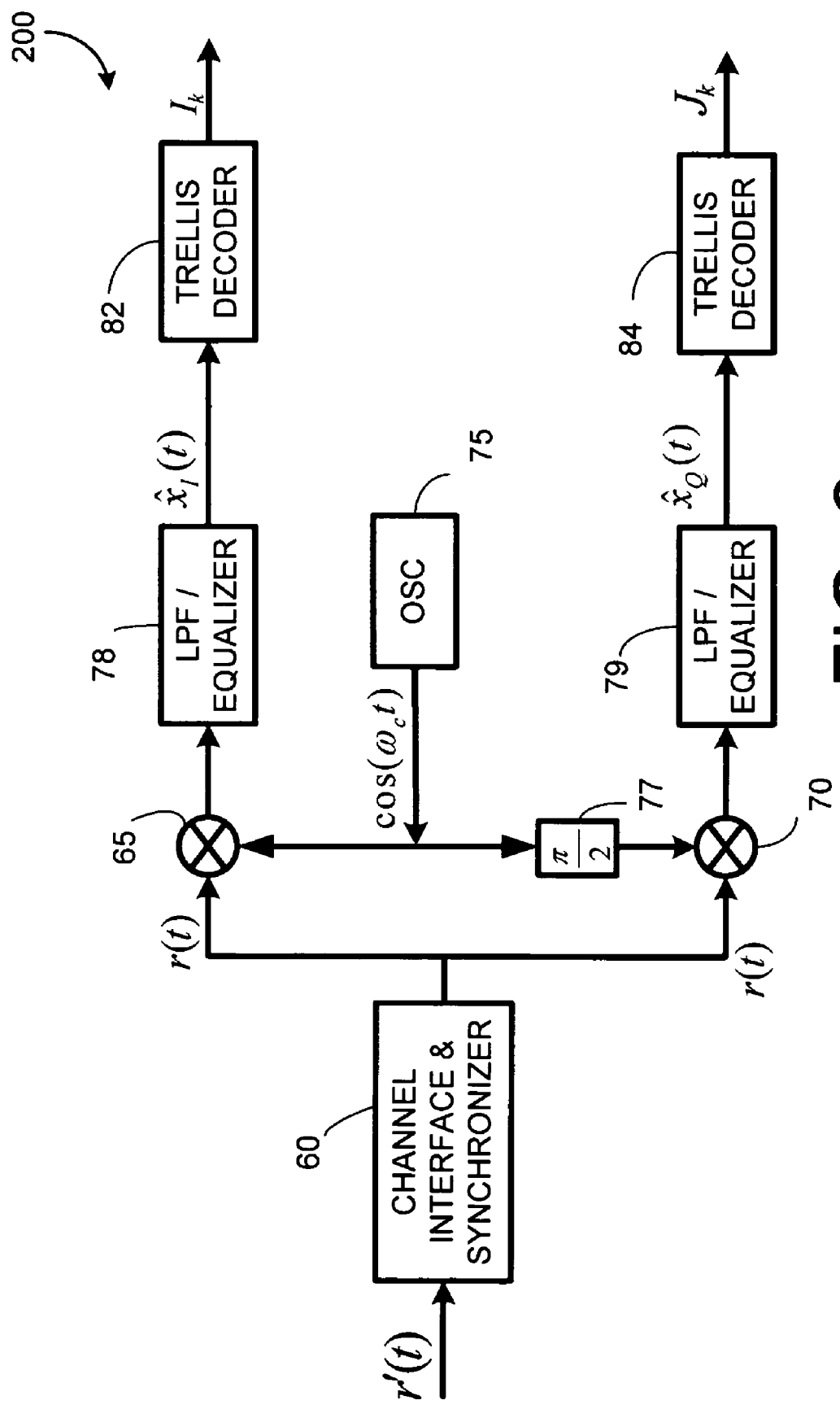
FIG. 2 is a block diagram that illustrates key aspects of a CPS QM-CPM receiver apparatus and methods, and/or a CPS PAM/QAM receiver apparatus and methods.

FIG. 2 illustrates a receiver apparatus or methods that can be used to receive and decode the signal transmitted in FIG. 1 (or FIG. 7A or 7B below). A received signal r'(t) is received from a channel along with any noise and distortion. A channel interface and synchronizer 60 optionally performs carrier recovery, symbol timing recovery, and any needed channel filtering or dispreading if an additional spreading layer is used beyond the $I_k$ and $J_k$ sequences (which can represent raw data sequences, coded data sequences, or spread-data chipping sequences, depending on the embodiment (as discussed in further detail in connection with FIG. 13). The output of block 60 is fed to a quadrature demodulator 65, 70, 75, 77 and then to an optional pair of lowpass filter/equalizers 78, 79. The lowpass filter/equalizers 78, 79 also typically include A/D converters. A/D conversion can be performed after lowpass filtering to the $B_{99}$ bandwidth or more and further equalization can be in the digital domain. In a preferred embodiment, low pass filters 78, 79 are wideband enough so that oversampling can be performed in order to later compute a set of correlations of the $\hat{x}_I(t)$ and $\hat{x}_Q(t)$ with known component signals for subsequent branch metric computation for use in the Viterbi decoder. For example, a 4× to 8× oversampling may be desirable. If an equalization is used, it should cause the $\hat{x}_I(t)$ and $\hat{x}_Q(t)$, signals to have the general form of (10) or (22), for example by any known adaptive equalization method. In many cases equalization will not be needed, but the lowpass filter should be selected to be broad enough to accommodate the oversampling rate of the system.

The outputs of 78, 79 are a pair of estimated signals, $\hat{x}_I(t)$ and $\hat{x}_Q(t)$, that are each of the form of (10) with the addition of distortion. The distortion can include linear channel distortion, nonlinear channel distortion, additive noise, and other kinds of noise. The filters 78, 79 can be selected to reduce the distortion. The estimated signals, $\hat{x}_I(t)$ and $\hat{x}_Q(t)$, are then sent to Trellis decoders 82, 83 that are preferably implemented using the Viterbi algorithm or a variant thereof. A further discussion of the actions implemented by the Trellis decoders 82, 84 is provided hereinbelow in connection with FIG. 12.

The performance of the signals is determined by the minimum Euclidean distance. Since the performance of a quadrature multiplexed scheme with independent and similar channels is the same as that of any single channel, all properties of QM-CPM schemes, including the error probability, can be found by considering the transmission of any single PR-MSK-PAM signal. Considering the transmission of a single PR-MSK-PAM signal, $x_I(t)$ in (10), over an AWGN channel with psd $N_0/2$, the asymptotic bit error rate variation of a scheme with squared minimum distance, $d_{min}^2$, is given by $$P_{be} \approx Q\left(\sqrt{\frac{d_{min}^2 E_b}{N_0}}\right) \quad (13)$$

where $E_b$ is the average bit energy. In general, if a single CPM-PAM signal m(t) used on a single channel (I or Q) carries n bits, the average bit energy and the bit duration, $T_b$, are given by $$E_b = \overline{x_I^2(t)}T_b = \frac{T\overline{x_I^2(t)}}{n}; T_b = \frac{T}{n} \quad (14)$$

Note that for CPS PR-QM-MSK n=1, and for partial response multi-amplitude QM-MSK discussed herein, n>1.

The squared minimum distance, $d_{min}^2$, and the path memory length, $N_R$, which is the minimum number of intervals necessary to ensure that the distance between any two paths (merged or unmerged) is not less than the minimum distance, can be numerically found. Similarly, using the spectral variations given by (9), the normalized 99% bit bandwidth, $B_{99}T_b$, of constructed partial response signals can be found. These bandwidths are calculated considering that a similar signal can be used on the other quadrature channel, effectively dividing the normalized bandwidth found from (9) by half.

FIG. 4 is a table that lists the properties of attractive CPS PR-QM-MSK schemes that have been constructed using the CPS filter of equation (6). These schemes are found by examining schemes for L=1, 2, 3 and 4 and changing α in steps of T/8 from 0 to LT/2. The peak to average power ratio (PAPR) values are calculated by considering the signals transmitted signal in (10) and numerically optimizing the delay between MSK-PAM signals on I and Q channels, $\tau_{I,Q}$, to minimize PAPR. Attractive schemes that have higher distances, lower bandwidths, lower receiver path memory lengths and lower PAPR values have been selected in FIG. 4. Recalling that QM-MSK signals have a minimum distance of $d_{min}^2=2.0$ and a normalized bandwidth of $B_{99}T_b=0.6$, an inspection of FIG. 4 indicates that the performance bandwidth of QM-MSK signals can be significantly improved by using partial response signaling. Schemes with the same or similar performance as QM-MSK but with significantly lower bandwidth are recorded in FIG. 4. However, all schemes listed in FIG. 4 have $2^{(L+1)}$ states compared with 2 states of their underlying QM-MSK signals.

The above CPS PR-QM-MSK can be extended to develop multi-amplitude QM-MSK (MA-QM-MSK) signals to form partial response MA-QM-MSK, (PR-MA-QM-MSK) signals that use a CPS filter (CPS PR-MA-QM-MSK). A regular MA-QM-MSK signal can be constructed by considering a linear combination of n separate component MSK-PAM signals, $m_i(t)$ in the form of (1), i=1, 2, . . . n, corresponding to n independent message sequences on each of the two channels separately. These MA-QM-MSK signals increase the transmission rate by a factor n compared with QM-MSK signals. Further, since the bandwidth of the linear combination remains the same as the bandwidth of any single component signal in the linear combinations, the normalized bit bandwidth of the MA-QM-MSK signal is reduced by a factor n compared with that of QM-MSK signals. The resulting combined component PAM signal obtained from the linear combination of n MSK-PAM signals, which is referred to as MA-MSK-PAM signal can be expressed as:

$$m_{MA-MSK-PAM}(t) = \sum_{i=1}^{n}(2n-2i+1)m_i(t) \quad (15)$$

Note that equation (15) would be carried out in the baseband trellis modulation blocks 105 and 115 of FIG. 1. It is noted that the signal in (15) that carries n binary signals can be viewed as a M=$2^n$ order PAM signal. Further, the MA-MSK-PAM signal in (15) has a state structure with $2^n$ states with $2^n$ paths leaving every state and has waveforms similar to those illustrated in FIG. 3 with i, j=1.2, ... $2^n$. A CPS PR-MA-QM-MSK signal can then be formed by passing the regular MA-MSK-PAM signal in (15) through the CPS filter 112, 125 with impulse response function h(t) illustrated in FIG. 1. CPS PR-MA-QM-MSK signals can be received and decoding using the receiver method or apparatus structure as illustrated in FIG. 2. The only difference is that trellis decoders 82, 84 are designed to decode (15) instead of QM-CPM or QM-MSK type signals.

Even though any $m_i(t)$ in (1) is non-linear with respect to the message signals, the combined signal in (15) is processed by the pulse shaping filter in a linear manner. Hence, similar to deriving properties of regular M-PAM signals from 2-PAM signals in linear modulation, the properties of CPS PR-MA-QM-MSK can be derived from the corresponding properties of CPS PR-QM-MSK signals discussed in sections 2 and 3 as demonstrated below. The average energy of the combined PR-MA-MSK-PAM signal in (15) can be written as $$E_{PR-MA-MSK-PAM} = E_{PR-MSK-PAM} \sum_{i=1}^{n} (2n-2i+1)^2 \quad (16)$$

$$= \frac{(M^2-1)}{3} E_{PR-MSK-PAM}$$

where, $E_{PR-MSK-PAM}$ is the energy of a single PR-MSK-PAM signal in (10).

It is noticed that the term (2n−2i+1) in (15) forces the separation between any two waveforms of two adjacent $m_i(t)$ signals in (15) to be at least equal to the minimum separation of waveforms of a single QM-MSK that employs waveforms p(t) shown in FIG. 3. Hence, since the pulse shaping filter is linear, the raw minimum squared distance or $m_{PR-MA-MSK-PAM}(t)$, $D^2_{min,PR-MA-MSK-PSM}$, is the same as the raw minimum squared distance of any single $m_i(t)$, $D^2_{min,PR-MSK-PAM}$. Hence, the normalized minimum squared distance of CPS PR-MA-QM-MSK, which is the same as the normalized squared minimum distance of any component MA-MSK-PAM signal used on I or Q channel, is given by $$d^2_{min,MA-MSK-PAM} = \frac{D^2_{min,PR-MA-MSK-PAM}}{2E_{PR-MA-MSK-PAM}} \log_2 M \quad (17)$$

$$= \frac{D^2_{min,PR-MSK-PAM}}{2E_{PR-MSK-PAM}} \left(\frac{3\log_2 M}{M^2-1}\right)$$

$$= d^2_{min,PR-MSK-PAM} \left(\frac{3\log_2 M}{M^2-1}\right)$$

The normalized minimum distance of CPS PR-MA-QM-MSK signals can thus be derived from the normalized minimum distance of CPS PR-QM-MSK signals as illustrated by (17). Further, due to the same set merging events found in all different $m_i(t)$ variations in (15), the path memory length of any CPS PR-MA-QM-MSK signal is the same as that of any component CPS PR-QM-MSK signal in terms of symbol intervals. Due to the linear form of (15) and linear filtering in FIG. 1, the power spectrum of CPS PR-MA-QM-MSK is the identical to the power spectrum of CPS PR-QM-MSK. Since a single PR-MA-MSK-PAM signal transmits n bits during any interval, the normalized 99% bit bandwidth of CPS PR-MA-QM-MSK can be written in terms of the normalized bandwidth of CPS PR-QM-MSK signals as:

$$B_{99}T_{b,QM-MA-MSK} = \frac{B_{99}T_{b,QM-MSK}}{\log_2 M}. \quad (18)$$

Note from (15) that the maximum amplitude of PR-MA-MSK-PAM signals, $A_{max,MA-MSK-PAM}$, is (M−1) times the maximum amplitude of PR-MSK-PAM signals, $A_{max,MSK-PAM}$; $A_{max,MA-MSK-PAM}$=(M−1)$A_{max,MSK-PAM}$. Hence, the PAPR of PR-QM-MA-MSK signals (which is equal to the PAPR of PR-MA-MSK-PAM signal) can be written using (16) as:

$$PAPR_{PR-MA-QM-MSK-PAM} = \frac{(M-1)^2 A^2_{max,PR-MSK-PAM}}{E_{PR-MA-MSK-PAM}} \quad (19)$$

$$= \frac{3(M-1)^2}{(M^2-1)} \frac{A^2_{max,PR-MSK-PAM}}{E_{PR-MSK-PAM}}$$

$$= \frac{3(M-1)^2}{(M^2-1)} PAPR_{PR-QM-MSK}$$

$$= \frac{3(M-1)}{(M+1)} PAPR_{PR-QM-MSK}$$

The PAPR of CPS PR-MA-QM-MSK signals, $E_{PR-MA-MSK-PAM}$, can thus be found from the corresponding PAPR of CPS PR-QM-MSK signals, $PAPR_{PR-QM-MSK}$, that are listed in FIG. 4 using (19).

It follows from (17)-(19) that the properties of CPS PR-MA-QM-MSK signals can be found from those of the corresponding CPS PR-QM-MSK signals. Since a regular MA-MSK-PAM signal with n component signals has $2^n$ states, following the discussion in section 3, a PR-MA-MSK-PAM signal has $2^{n(L+1)}=M^{(L+1)}$ states, compared with $2^{(L+1)}$ states of a PR-MSK-PAM signal.

FIG. 5 is a table that lists the properties of a collection of selected CPS PR-MA-QM-MSK signals. Noticing that MA-QM-MSK signals without pulse shaping has $d_{min}^2$=0.8 and $B_{99}T_b$=0.3 when M=4, and $d_{min}^2$=0.286 and $B_{99}T_b$=0.4 when M=8, it is seen from FIG. 5 that the performance/bandwidth tradeoff of MA-QM-MSK signals can be significantly improved by applying pulse shaping. It is also seen from Tables 1 and 2 that compared with CPS PR-QM-MSK, CPS PR-MA-QM-MSK signals can be constructed to have significantly lower bandwidths, however, as expected, with lower minimum distances.

FIG. 6 is a table that lists the properties of RC filtered QAM signals with 20% roll-off. All partial response schemes listed in FIGS. 4 and 5 compare favorably with RC filtered QAM signals listed in FIG. 6.

Compact pulse shaping (CSP) can also be applied to ordinary linearly modulated PAM/QAM. FIG. 7 shows a block diagram of a CPS PAM/QAM transmitter apparatus. Consider an NRZ message signal, m(t), that, during any k th interval, can be written as $I_k z(t-kT)$, where $I_k \in \{+1,-1\}$ is the symbol transmitted during the k th interval, kT≦t≦(k+1)T, and $$z(t) = \frac{A}{T} rect(t/T)$$

is a rectangular pulse with amplitude $$\frac{A}{T}$$

from 0 to T. The Fourier transform (FT) of z(t) can be expressed as:

$$S_z(f) = \left(\frac{\sin(\pi fT)}{\pi fT}\right)^2. \quad (20)$$

When m(t) is passed through a pulse shaping filter with a finite-length impulse response, h(t), a transmitted signal is generated of the form, $$x(t) = \sum_k I_k p(t - kT),$$

where p(t)=h(t)*z(t), and "*" denotes convolution. The power spectral density (psd) of x(t) can be written as $S_x(f)=S_z(f)|H(f)|^2$, where, is the psd of z(t), H(f) is given by (7) when the h(t) of (6) is selected. Therefore, from (7) it follows that psd of x(t) can be written as:

$$S_x(f) = \left(\frac{\sin(\pi fT)}{\pi fT}\right)^2 \left(\frac{\sin[\pi(L-\alpha)fT]}{\pi(L-\alpha)fT}\right)^2 \left(\frac{\cos(\pi\alpha fT)}{1-4f^2\alpha^2T^2}\right)^2. \quad (21)$$

While ordinary RC filters typically use L=40, the CPS filters herein use much shorter values for L, for example, $2 \leq L \leq 4$. As discussed in connection with FIGS. 8-10, with proper selection of L and $\alpha$, (21) can produce QAM schemes with lower $B_{99}T_b$ than the RC filtering approach as described in FIG. 6.

Given the above framework, when binary signaling is used, the CPS PAM transmitted signal, x(t), can be written as:

$$x(t) = \sum_{j=1}^{L+1} I_{k-j+1} p(t - kT + jT - T); kT \leq t < (k+1)T \quad (22)$$

Figure 7A:
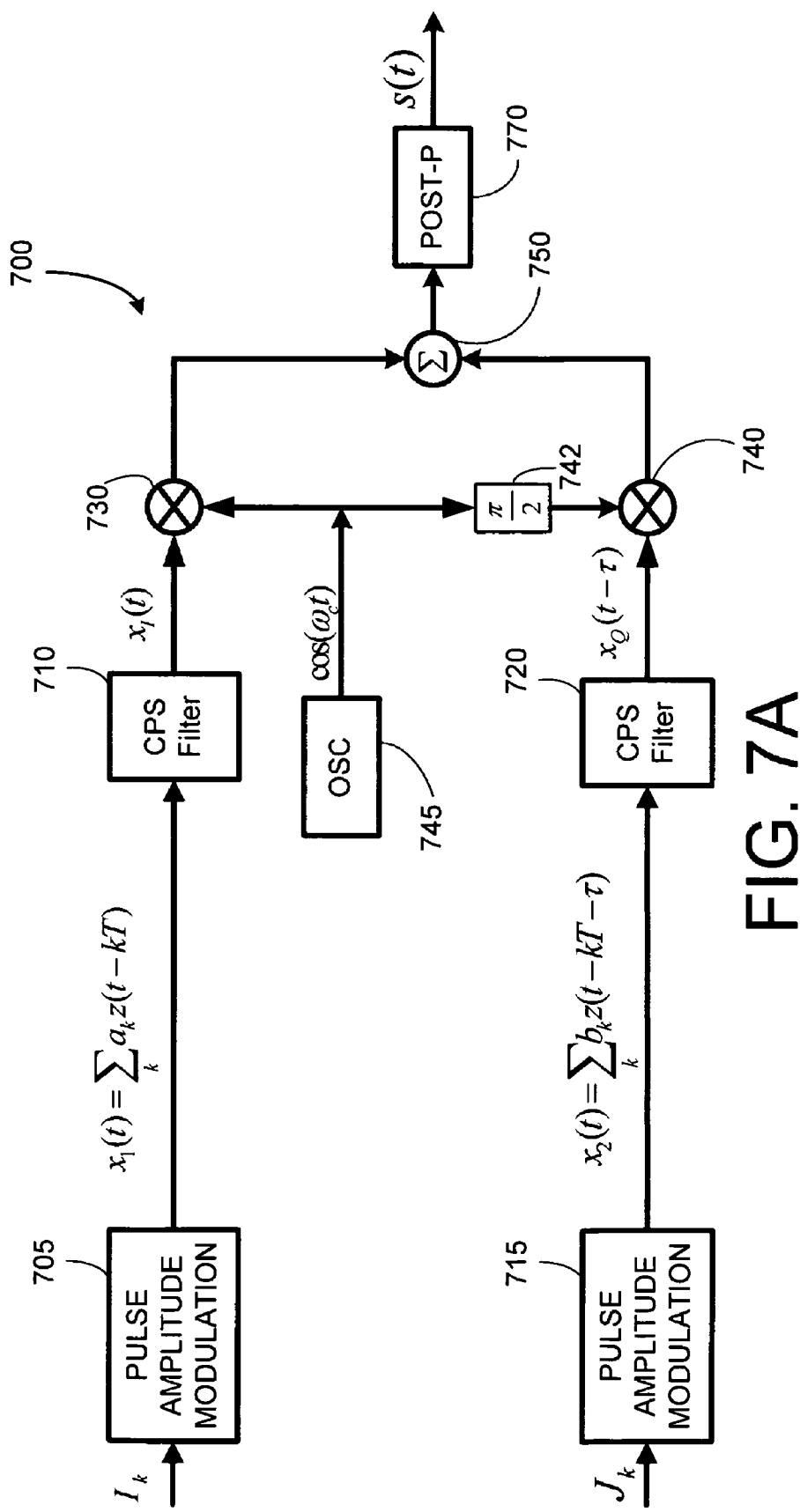
FIG. 7A shows a block diagram of a CPS PAM/QAM transmitter apparatus using a baseband PAM modulation followed by CPS filtering.
Figure 7B:
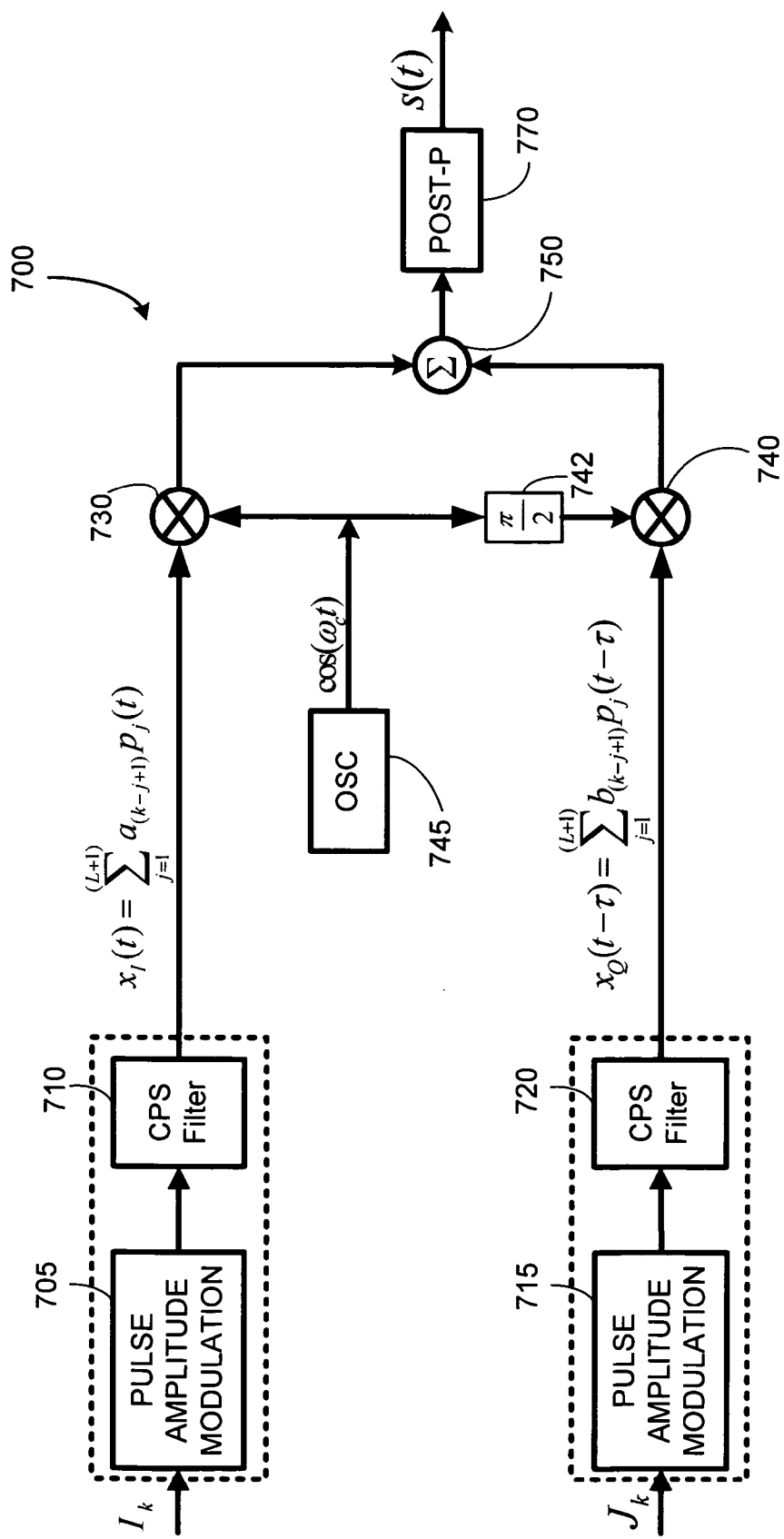
FIG. 7B shows a block diagram of a CPS PAM/QAM transmitter apparatus where baseband message signals are generated via concatenated pulse shape filtering.

That is, to decode m(t) during the k th interval, it will be necessary to have the knowledge of L previous symbols, $(I_{k-1}, I_{k-2}, \ldots I_{k-L})$. Equation (22) has a finite state structure with $2^L$ states, and the state during any k th interval can be defined as: $S_k=(I_{k-1}, I_{k-2}, \ldots I_{k-L})$. Therefore, (22) can be decoded using coherent demodulation and Viterbi decoding. A CPS PR QPSK or CPS PR QAM signal may be written:

$$x_{trans}(t) = x_I(t) + jx_Q(t) \quad (23)$$

where $x_I(t)$ and $x_Q(t)$ are signals of the form of (22) (24) or (26) transmitted on I and Q channels respectively, driven by data sequences $I_k$ and $J_k$ as in FIG. 7A and/or FIG. 7B.

A CPS-filtered M-ary PAM transmitted signal x(t) corresponding to an M-ary message sequence $a=(\ldots a_{k-1}, a_k, a_{k+1}, \ldots)$ can be written as:

$$x_I(t) = \sum_{j=1}^{L+1} a_{k-j+1} p(t - kT + jT - T); kT \leq t < (k+1)T \quad (24)$$

A bidirectional mapping exists between $\{I_k\}$ and $\{a_k\}$. In order to define $x_I(t)$ during the k th interval, it is necessary to have the knowledge of L previous symbols, $(a_{k-1}, a_{k-2}, \ldots a_{k-L})$. That is, since each of the $a_k$ values can take on M possible PAM amplitude values, the signal of equation (24) has a finite state structure with $M^L$ states, and the state during any k th interval can be defined as $$S_k = (a_{k-1}, a_{k-2}, \ldots a_{k-L}). \quad (25)$$

Again, the pulse shaped PAM signals discussed here can be decoded using coherent demodulation and Viterbi decoding. Also, (22) can be seen to be a special case of (24), i.e., where M=2.

To better understand the state structure of (24), note that (24) may be written as:

$$x_I(t) = \sum_{j=1}^{(L+1)} a_{(k-j+1)} p_j(t), kT \leq t < (k+1)T \quad (26)$$

where $$p_j(t) = p(t+jT), (j-1)T \leq t < jT, j=1, 2 \ldots L+1. \quad (27)$$

As can be seen from (26), $p_j(t)$ corresponds to a $j^{th}$ symbol interval portion of p(t), and it can be recalled that p(t) spans a total of L+1 symbol intervals. At the beginning of each signaling interval, i.e., at time kT, the signal $x_I(t)$ in (26) will be in one of the $M^L$ states, $S_k=(a_{k-1}, a_{k-2}, \ldots a_{k-L})$. After a next data symbol is received, the next state will become $S_{k+1}=(a_k, a_{k-1}, \ldots a_{k-L+1})$. That is, given that $x_I(t)$ in (26) is already in state $S_k=(a_{k-1}, a_{k-2}, \ldots a_{k-L})$, $x_I(t)$ can only transition into M possible next states, one for each possible value, $a_k$, and the rest of the state variables, $(a_{k-1}, a_{k-2}, \ldots a_{k-L})$, just get shifted to the right. That is, there are a total of $M^L$ states and M possible state transitions out of each state. There is one state transition signal for each possible PAM amplitude symbol value that the next symbol $a_k$ can take on in the first position of $S_{k+1}$. Note if the source binary data sequence is itself convolutionally or otherwise encoded, this can further limit the possible values that $a_k$ can take on and further limit the number of possible state transitions. That is, the CPS PR trellis may be modified to take into account any coding that already exists in the sequence $a_k$. Equations (24) and/or (26) can thus be used directly to compute the state transition signals by shifting the previous state to the right and computing the sum of (24) or (26) for each of the M possible different values that $a_k$ can take on. That is, there are a total of $M^{L+1}$ different state transition signals and there is one branch metric per state transition signal as is discussed below in connection with the Viterbi decoder.

Referring to FIG. 7A, the data sequences $I_k$ and $J_k$ are fed onto I and Q channels and enter the pulse shaping blocks 705, 715 to generate respective output pulse trains $$x_I(t) = \sum_k a_k z(t - kT) \text{ and } x_Q(t) = \sum_k b_k z(t - kT - \tau),$$

where $\tau$ is an optional delay selected to minimize PAPR. The sequences $\{a_k\}$ and $\{b_k\}$ represent M-ary PAM sequences that are derived from mapping sets of the bit streams $I_k$ and $J_k$ onto the M-ary PAM symbols. In some embodiments, encoding such as block or convolutional encoding may be used in the mapping of the bit streams $I_k$ and $J_k$ onto the M-ary PAM symbols sequences, $\{a_k\}$ and $\{b_k\}$. The time shift, $\tau$, is often set to zero when z(t) is the rectangular pulse described above. However, other pulse shapes for z(t) can be used in which case $\tau$ may be nonzero. The output pulse steams from 705 and 715 are then sent to CPS filters 710, 720 and are quadrature modulated using 730, 740, 742, 745, 750. In a preferred embodiment, the CPS filters are implemented according to equation (6) with a particular choice of the parameters of equation (6), as illustrated by way of example in FIGS. 8-10.

In alternative embodiments a square root version of (6) can be used in which case another square root pulse shaper is implemented at the receiver. An optional post processing module 770 similar to 170 can also be used, for example for bandpass filtering, precoding, pre-equalization or to perform frequency division multiplexing of a single channel signal, or the like. Similarly, an analog reconstruction filter followed by D/A conversion can be implemented as part of blocks 710, 720, or 770, depending on the embodiment.

FIG. 7B shows an alternative embodiment. In the embodiment of FIG. 7B, the baseband pulse shape z(t) is pre-filtered with the CPS filter, h(t) to create the partial response pulse shape p(t), so that baseband signal generation can use one of (24) or (26) to directly generate the baseband message signals, $m_I(t)$ and $m_Q(t)$, for example, when the form of (27) is used, where $$x_I(t) = \sum_{j=1}^{(L+1)} a_{(k-j+1)} p_j(t) \text{ and } x_Q(t) \sum_{j=1}^{(L+1)} b_{(k-j+1)} p_j(t).$$

In both of FIGS. 7A and 7B, the baseband message signals, $x_I(t)$ and $x_Q(t)$ are the same and are said to be CPS-Pulse encoded with the data streams, $I_k$ and $J_k$. In both FIGS. 7A and 7B, the CPS-Pulse encoded baseband message signals, $x_I(t)$ and $x_Q(t)$ can be seen to follow equations (24) and (26) given that $I_k$ is used to generate the PAM sequence, $a_k$, and that $J_k$ is used to generate the PAM sequence, $b_k$. This can also be seen by comparing FIGS. 7A and 7B and noting they produce the same baseband message signals, $x_I(t)$ and $x_Q(t)$. As mentioned above, different embodiments can perform A/D conversion and reconstruction filtering prior to or after the modulation 730, 740.

In operation, a communication transmitter is adapted to produce a communication signal for transmission of a binary data sequence via a channel to a communication receiver. The binary data sequence is transformed onto an compact pulse shape (CPS) encoded partial response signal, $x_I(t)$, e.g., given by $$x_I(t) = \sum_{j=1}^{L+1} a_{k-j+1} p(t - kT + jT - T).$$

Typically t is a discrete time variable that has several samples per symbol interval, $kT \leq t < (k+1)T$, where T is a symbol interval duration, k is an integer counting variable, L is a positive integer and $L \leq 7$, $a_k$ is an M-ary pulse amplitude modulated sequence representative of the binary data sequence, where $M \geq 2$, $p(t) = z(t) \otimes h(t)$ is a compact pulse shape whose length is no longer than (L+1)T, z(t) is a baseband pulse shape with a pulse width that is no longer than T, and h(t) is a finite impulse response filter whose impulse response has a length no longer than LT. The $x_I(t)$ signal is then processed to generate the communication signal therefrom, for example, by D/A conversion and reconstruction filtering to form a baseband communication signal, by amplitude modulating to form an in-phase passband communication signal, or by to quadrature multiplexing along with a second signal, $$x_Q(t) = \sum_{j=1}^{L+1} b_{k-j+1} p(t - kT + jT - T),$$

to form a CPS PR QAM type communication signal.

Again, The above signals are constructed using with h(t) such a that no receive equalizer (such as an RC filter) need be used to cause zero intersymbol interference or a fixed relationship of intersymbol interference to exist at discrete sampling points of a received and sampled version of the communication signal, $\hat{x}_I(kT+\Delta)$, as observed in the receiver prior to any subsequent trellis decoding, where $\Delta$ is an optional receiver variable selectable in the receiver to compensate a time shift introduced between the transmitter and receiver. That is, receiver processing is used where the received version of the communication signal is oversampled and Viterbi decoded as discussed below instead of using prior art RC filtering or prior art partial response signaling or prior art partial response maximum likelihood type processing.

CPS PAM/QAM signaling schemes can be compared in terms of minimum distances, bandwidth, PAPR and the path memory length of the Viterbi decoder used to decode (22)-(23). The most attractive schemes can be identified by numerically searching over the values of L=1, 2, 3 and 4 and changing $\alpha$ in steps of T/8 from 0 to LT/2. Any undesirable schemes are discarded.

FIG. 8 lists the properties of CPS 2-PAM/QPSK schemes with the best properties. It is seen from FIG. 8, that the normalized minimum distance is a function of $\alpha$. Note that L=2, $\alpha$=3/8 generates an attractive scheme with $d_{min}^2$=2.0 and $B_{99}T_b$=0.458. Compare the L=2, $\alpha$=3/8 scheme of FIG. 8 to the ordinary RC filtered QPSK entry of Table 4 and note the lower bandwidth and PAPR using the compact pulse shaped filter approach. Higher values of L produce schemes with lower values of $d_{min}^2$, but with significantly lower bandwidth.

Assuming that the transmitted symbols in (24) are independent, the average transmitted energy of (24) can be written as $$E = \overline{a_k^2} \sum_{j=1}^{(L+1)} \int_0^T p_j^2(t) dt \tag{28}$$

where $\overline{a_k^2}$ is the average value of $a_k^2$ during any interval. For binary signaling, $\overline{a_k^2}=1$, and $$E_{Binary} = \sum_{j=1}^{(L+1)} \int_0^T p_j^2(t) dt = E_p. \tag{29}$$

Hence, $E_{Binary}$ is same as the energy of the pulse, p(t), i.e., $E_p$. Since z(t) is constant from 0 to T, $$\sum_{i=1}^{3} p_i(t_0)$$

is constant for all $0 \leq t_0 \leq T$, and further this sum is equal to the area of the pulse h(t) which is denoted here by $A_h$. Hence, in binary CPS 2-PAM signals, the maximum signal amplitude, which corresponds to all ones sequence, is indeed equal to $A_h$. The PAPR of pulse shaped PAM signals can thus be written as:

$$PAPR_{Binary} = \frac{A_h^2}{E_{Binary}}. \tag{30}$$

Because $A_h$ is constant, any time shift between the I and Q channels would not improve the PAPR.

Next consider the construction of CPS M-PAM signals using the CPS h(t) when all M symbols, $a_k \in \{\pm 1, \pm 3, \ldots, \pm(M-1)\}$, are equiprobable. For such a signal, $$\overline{a_k^2} = \frac{(M^2-1)}{3},$$

so it follows from (24), that the average energy per symbol is:

$$E_M = \frac{(M^2-1)}{3} \sum_{i=1}^{(L+1)} p_i^2(t) = \frac{(M^2-1)}{3} E_p = \frac{(M^2-1)}{3} E_{Binary} \quad (31)$$

By linearity, the response to any PAM symbol $a_k$ can be found by simply multiplying the response to symbol '1' by $a_k$. So instead of calculating the raw squared minimum distance by considering the transmission of only the two symbols +1 and −1 during every interval, the raw squared minimum distance can be obtained if we only transmit any two adjacent symbols (say +1 and +3, or −1 and −3, etc.). Further, along the minimum distance paths, if the symbols are changed to have a separation of more than 2 (like +3 and −1 or +3 and −3, etc.), it is likely to increase (rather than to decrease) the separation between the paths. Hence, as verified numerically in all cases considered herein, the raw minimum squared distance $D_{min}^2$, with M-ary signaling would be expected to be the same as that with binary signaling. Since $\log_2 M$ bits are carried by every symbol, the $d_{min}^2$ of a CPS M-PAM signals is:

$$(d_{min}^2)_{M-PAM} = \frac{D_{min}^2}{2E_M} \log_2 M \quad (32)$$

$$= \frac{D_{min}^2}{2E_{Binary}} \left( \frac{3}{M^2-1} \right)$$

$$= (d_{min}^2)_{Binary} \left( \frac{3}{M^2-1} \right)$$

Further, due to the presence of the same type merging events, the path memory length of any pulse shaped M-PAM signals is the same as that of the corresponding CPS binary PAM signals. By linearity, the spectrum of CPS M-PAM signals is identical to that of CPS binary PAM signals normalized to the transmission rate. Since an M-PAM symbol carries $\log_2 M$ bits, the 99% bit bandwidth of M-PAM signals with CPS filtering can be obtained from the corresponding values of binary pulse shaped PAM signals listed in FIG. 8 as:

$$B_{99}T_{b,M-PAM} = \frac{B_{99}T_{b,Binary}}{\log_2 M} \quad (33)$$

Following the PAPR analysis of the binary case, it is seen that the maximum amplitude of CPS M-PAM signals is $(M-1)A_h$, and this results from the continuous transmission of the symbol $(M-1)$. The PAPR of CPS M-PAM signals thus can be written as:

$$PAPR_{M-PAM} = \frac{(M-1)^2 A_h^2}{E_M} \quad (34)$$

$$= \frac{3(M-1)^2}{(M^2-1)} \frac{A_h^2}{E_{Binary}}$$

$$= \frac{3(M-1)}{(M+1)} PAPR_{Binary}$$

That is, equations (28)-(30) indicate that the properties of CPS M-PAM signals can be deduced from the properties of CPS binary PAM signals.

FIG. 9 lists the properties of attractive CPS 4-PAM/16-QAM and CPS 8-PAM/64-QAM signals. The number of states of the CPS M-PAM signals will be increased to $M^L$ (from $2^L$ of binary signals), and M paths instead of 2 will originate from every state. In order to limit complexity, FIG. 9 considers the L=1, 2 and 3 cases with M=4, and the L=1 and 2 cases with M=8.

CPS PR QAM is created according to (23) by transmitting CPS PR M-PAM on each of the I and Q channels. If the I and Q channels are jointly decoded, the CPS PR QAM signals would be decoded by calculating the branch metrics considering the complex signals and decoding on a Viterbi decoder with $(M^2)^L$ number of states. Further, on this trellis $M^2$ number of paths leave from every state. Hence, for practical reasons, in many cases the highest value of L that can be used will be limited to L=1. However, if decoding can be separately done on I and Q channels, even though two separate decoders are needed, the number of states of each decoder will reduce to $M^L$, and that allows the use of higher values of L. Hence, it is preferable to use two separate decoders on I and Q channels whenever possible. Such a simplification should be used when the minimum distance of the QAM constellation is the same as the minimum distance of the I and Q PAM constellations. Many commonly used QAM constellations satisfy the above property, such as rectangular 16-QAM, 64-QAM and 256-QAM. Therefore, the properties of the schemes listed in Tables 1 and 2 for M=2, 4 and 8 are identical to the properties of CPS PR QPSK, 16-QAM and 64-QAM respectively.

Next consider non-rectangular QAM constellations such as 32CR and 128CR, that transmit an odd number of bits/symbol and require joint I and Q coding. With these constellations, the minimum distance of their I and Q component PAM constellations is equal to that of the overall QAM constellation. However, due to the removal of corner points, invalid combinations of I and Q PAM symbols can be generated in the two independent decoders. Additional work will be required to correct these decisions. A common scheme is to adjust one of the corner symbols on I or Q to the nearest next valid symbol. The total metric on the QAM decoded sequence can be used to determine which PAM sequence should be adjusted. Since the metric on the QAM sequence is the sum of the metrics along the PAM decoded sequences on I and Q channels, the PAM sequence that would make the smaller increase in the metric due to the adjustment is selected as the PAM sequence to be adjusted.

CPS 32CR (32-cross QAM) signals can be generated using I and Q CPS 6-PAM signals, and a CPS 128CR signal can be generated using I and Q CPS 12-PAM signals. The CPS 32CR and 128CR signals then can be decoded using two Viterbi decoders each with $6^L$ (in 32CR) and $12^L$ (in 128CR) states and making adjustments when an invalidly decoded QAM symbol is detected. For example, when L=2, a CPS 32CR receiver uses two 36 state decoders, and a CPS 128CR receiver uses two 144 state decoders.

M-PAM signals with $M \neq 2^n$ such as M-PAM signals with M=3, 5, 7, 6 and 12 all have the same raw minimum distance but have different average symbol energies. Also, when all M symbols are equiprobable, the average energy of any of these M-PAM signals is given by $E_M = (M^2-1)/3$, just like M-PAM signals when $M=2^n$. However, M-PAM signals with $M \neq 2^n$ that correspond to QAM constellations, like in 32RC or 128CR, with equiprobable QAM symbols result in non-equiprobable PAM symbols. Specifically, the probability of transmitting a given corner symbol usually is lower than the probability of transmitting a given middle symbol. The probability of transmitting a given corner symbol and a given middle symbol is $q_1=2/M$ and $q_2=(M-2)/M$ respectively. If the spacing between adjacent constellation points on any axis is $\Delta$, Hence, the general expression for the average symbol energy of M-PAM signals is $$E_{M,General} = \Delta^2 \left[ q_1(M-1)^2 + q_2 \left\{ \frac{(M-2)^2 - 1}{3} \right\} \right] \quad (35)$$

A CPS 32CR scheme constructed by using two CPS 6-PAM signals on I and Q channels transmits 5 bits per interval, or equivalently 2.5 bits per interval through each of the 6-PAM signals. Since CPS filtering is linear, the properties of M-PAM signals that transmit r bits/interval can be found from Eqns. (32)-(34) by simply replacing $\log_2 M$ by r and making necessary adjustments as:

$$(d_{min}^2)_{M-PAM} = (d_{min}^2)_{Binary} \left( \frac{r}{E_{M,General}} \right) \quad (36)$$

$$B_{99}T_{b,M-PAM} = \frac{B_{99}T_{b,Binary}}{r} \quad (37)$$

$$PAPR_{M-PAM} = \frac{(M-1)^2}{E_{M,General}} PAPR_{Binary}. \quad (38)$$

The properties of CPS 32CR signals that employ pulse shaping with L=2 and $\alpha=3/8$ follow from (31)-(33) as $d_{min}^2=4\Delta^2/[(2E_{6,General})2.5]=0.5$, $B_{99}T_b=0.458/2.5=0.183$. Since, the corner symbols have been removed in the 32CR constellation, (38) cannot be directly used to calculate the PAPR of pulse shaped 32CR signals. The maximum power of 32CR is utilized when transmitting the symbol ±5a on one quadrature channel and transmitting ±3a on the other channel. Hence, the PAPR of CPS 32CR with L=2 and $\alpha=3/8$ is $PAPR_{CPS-32CR}=34$ $(PRPR_{Binary})/20=1.7(PAPR_{Binary})$. FIG. 10 lists the properties of pulse shaped 32CR and 128CR signals.

Simulations showed that for a given constellation size, CPS PAM/QAM signals perform slightly worse than their RC filtered counterparts. This difference in performance is due to an increase in path multiplicity of CPS PAM/QAM signals. However, as indicated below, when compared at a common value of $B_{99}T_b$, CPS QAM offers significant gains.

FIG. 6 lists the properties of RC filtered 16, 32, 64 and 128-QAM signals where the RC filter has a 20% excess bandwidth. Compare the CPS 2-PAM/QPSK scheme with L=2, $\alpha=3/8$ scheme of FIG. 8 to the ordinary RC filtered QPSK entry of FIG. 6 and note CPS's lower $B_{99}T_b$ when compared at the same constellation size. Next compare in FIG. 9 the CPS 4-PAM/16-QAM signals with L=2 and $\alpha=3/8$ and $B_{99}T_b=0.229$ to the 32-ary RC filtered QAM signals and $B_{99}T_b=0.24$ of Table 6. The CPS 4-PAM/16-QAM scheme provides $d_{min}^2=0.8$ as opposed to the 32-ary RC filtered QAM that provides $d_{min}^2=0.5$, to achieve a 2.04 dB gain in about the same bandwidth. Further, CPS 16-QAM has an observation interval of $N_R=9$ intervals and a PAPR of 3.71 as opposed to RC 32 CR that has an observation interval of 40 intervals, and a PAPR of 4.01. Similarly, at $B_{99}T_b=0.2$, compare the RC filtered 64-QAM scheme in FIG. 6, to the CPS 16-QAM with L=3 and $\alpha=5/4$ of FIG. 8. CPS 16-QAM provides a 3.67 dB gain over RC filtered 64-QAM at this bandwidth. Next compare the $B_{99}T_b=1.2/8=0.15$ RC filtered 256-QAM to the CPS 64-QAM scheme of FIG. 8 with L=2 and $\alpha=3/8$, and $B_{99}T_b=0.152$. CPS PR 64-QAM obtains 5.49 dB gain at this bandwidth.

Figure 11:
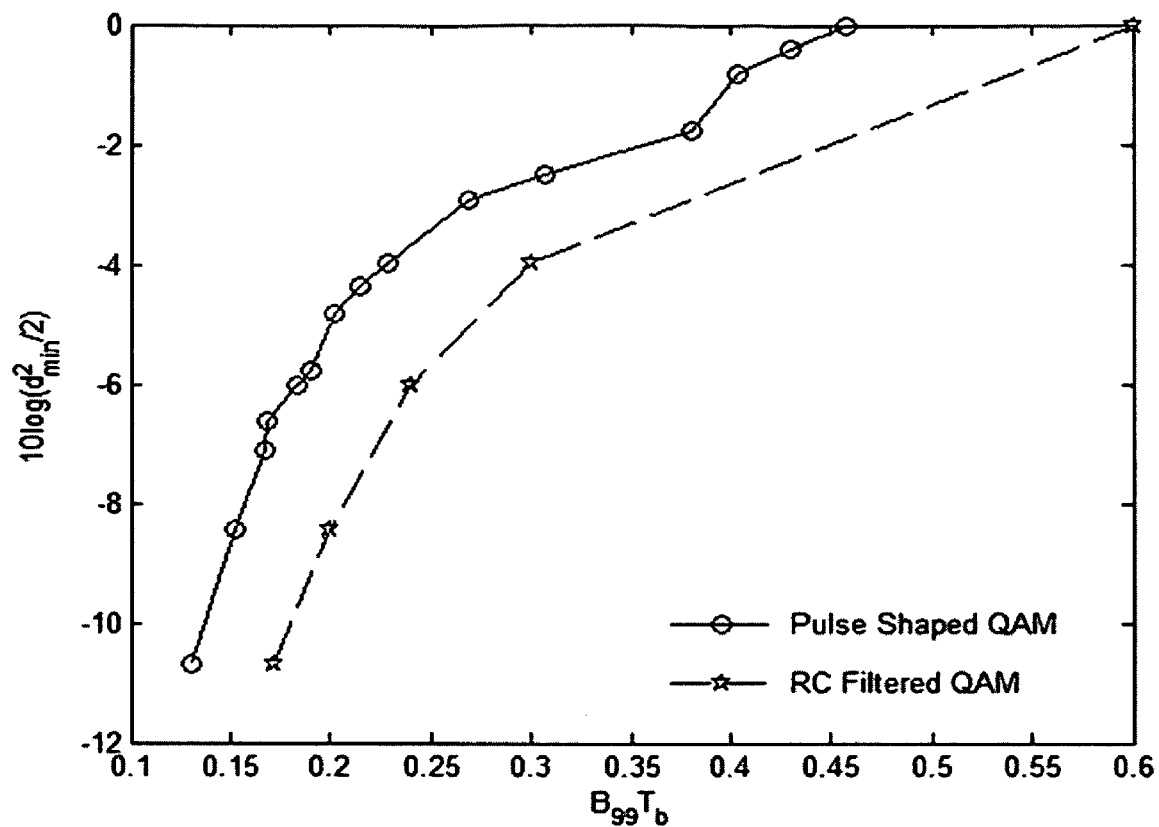
FIG. 11 shows curves that indicate the performance/bandwidth tradeoff of a set of attractive CPS PAM/QAM schemes versus RC filtered QAM with 20% roll-off.

FIG. 11 shows the performance/bandwidth tradeoff of a set of attractive CPS PAM/QAM schemes versus RC filtered QAM with 20% roll-off. It is seen that CPS signals offer significantly better performance/bandwidth tradeoff than RC filtered QAM signals. The above gains may be slightly reduced due to the effect of path multiplicity.

CPS PR PAM/QAM signals can be received and decoding using the receiver method or apparatus structure as illustrated in FIG. 2. The only difference is that trellis decoders 82, 84 are designed to decode (22)-(27) instead of QM-CPM or QM-MSK type signals. The outputs of 78, 79 are used sent to a correlation block inside the trellis decoders 82, 84 to compute correlations that are reused multiple times to compute branch metrics in the Trellis decoders decoder.

Figure 12:
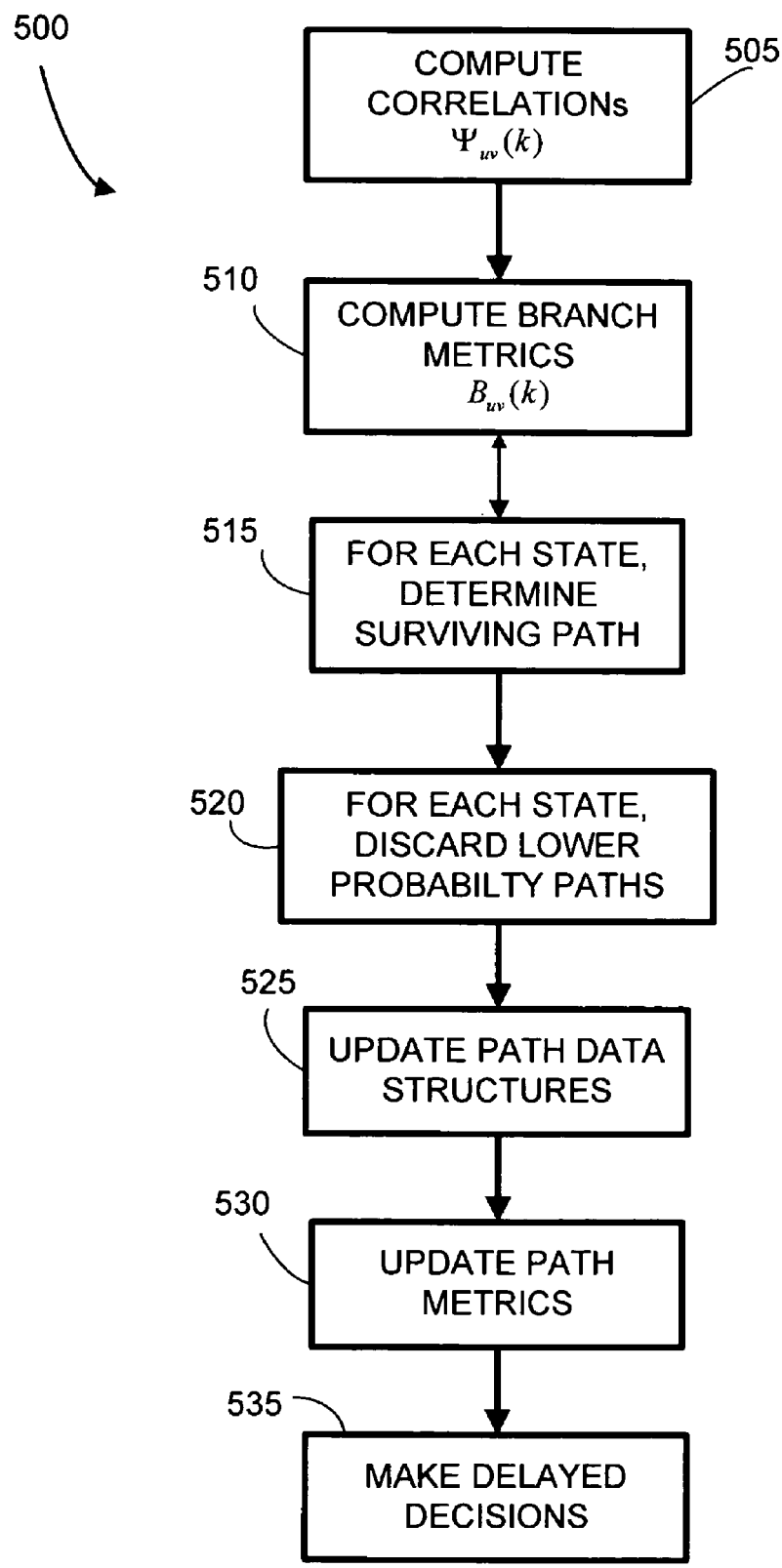
FIG. 12 is a flow chart that shows the main steps performed in the trellis decoder blocks of FIG. 2.

FIG. 12 is a flow chart that shows the main steps performed in the trellis decoder blocks 82, 84 of FIG. 2. As discussed above, the receiver structure of FIG. 2, can be used to decode and of the CPS/PR based schemes discussed herein to include CPS PR-QM-MSK, CPS PR-MA-QM-MSK, and CPS PAM/QAM. Block 505 computes correlations between a received signal a set of signals such as the $p_j(t)$ signals (27) during each interval. Block 515 computes a set of branch metrics, e.g., using template signals of the form of (26) that are indicative of state transition from a current state to a next state. For example, the correlations computed in step 505 can be reused over and over again to compute the correlations with the different state transition signals of the form of (26). For example, if Z(t) represents a received communication signal on the I-channel, the branch metric representative of the state transition between a state a at interval k to a state b at interval k+1 may be any quantity that approximates or provides a sufficient statistic for the distance value:

$$B_{a,b}(k) = \int_{kT}^{(k+1)T} [Z(t) - p_{a,b}(t)]^2 dt, \quad (39)$$

where the states a and b correspond to representative states of the form of the subscripts of p(t) in equation (10). In PAM/QAM embodiments where equations (22-27) are used, the states a and b correspond to respective ones of the $M^L$ states, where the state during any k th is given by $S_k=(a_{k-1}, a_{k-2}, \ldots a_{k-L})$. In total, $M^{L+1}$ branch metrics will need to be computed assuming the source binary data sequence is uncoded.

For more details, refer to U.S. Pat. Nos. 5,916,315 and 7,532,676 which are incorporated herein by reference in their entirety to provide further details on the Viterbi decoder implementation.

The complexity of the Viterbi depends on the value of L and on the size of the constellation M. During every interval, the receiver first calculates the correlation of the received signal with each of the (L+1) signal time segments with duration T of the pulse p(t). These segments in general can be expressed as all possible transitions in (22-27) that occur during $(j-1)T \leq t < jT$ where $j=1, \ldots, L+1$ in (22-27). If any of these segments are identical then fewer correlations need be computed. Specifically, it is necessary to calculate the correlations of the received signal during the interval with all distinct variations of p(t) which can occur in (22-27), and this is at most equal to (L+1). These correlations are then used and reused over and over again to calculate all $M^{(L+1)}$ branch metrics by taking the appropriate linear combinations of these (L+1) correlations according to (26). Since the branch metrics are symmetric (for example, the branch metric from state −1,−1" for symbol "−1" is the negative of that from state "1,1" for symbol "1", and the branch metric for symbol "3" from state "3,3" is 3 times that of symbol "+1" from state "1,1"), and since many partial calculations of branch metrics duplicate, the calculation of $M^{(L+1)}$ branch metrics can be simplified using a tree structure.

Block 515 is used to determine surviving paths, and block 520 is used to discard lower probability paths. Path data structures are updated at block 525, path metrics are updated at step 530, and delayed decisions are made at step 535. The Viterbi algorithm is well known and is a text book subject well known to those skilled in the art.

The performance/bandwidth advantage of CPS signals is achieved at the expense of complexity as they require Viterbi decoding at the receiver. However, the shorter observation windows of CPS signals compared the observation window of 40 intervals of RC filtered signals with 20% roll-off.

In embodiments where signals are generated using equations like (1)-(4) and (10), a communications receiver is adapted to process a received communication signal similar to the previously described communication signal that is generated at the transmitter. The received communication signal will normally be received with channel distortion which can include noise. For example, the received communication signal may be a distorted version of a transmitted communication signal that has encoded therein an $x_I(t)$ signal of the form, $$x_I(t) = \sum_{j=1}^{L+1} p_{Q_{(k-j+1)},Q_{(k-j+2)}}(t - kT + jT - T)$$

where t can be a discrete time variable as discussed above, and where L is a positive integer and preferably, $L \leq 7$. Also, $p_{Q_{(k-j+1)},Q_{(k-j+2)}}(t) = m_{Q_{(k-j+1)},Q_{(k-j+2)}}(t) \otimes h(t)$ is a compact pulse shape whose length is no longer than (L+1)T, h(t) is a finite impulse response filter whose impulse response has a length no longer than LT, $m_{Q_{(k-j+1)},Q_{(k-j+2)}}(t)$ is a state transition signal of a first real-valued baseband message signal ($m_1(t)$ signal) from a state Q(k−j+1) to a state Q(k−j+2), the $m_1(t)$ signal follows a first trajectory through an amplitude trellis in accordance with a binary data sequence that has been trellis encoded therein, and the first trajectory passes through a first particular sequence of trellis states, $Q_0, Q_1, \ldots Q_k$, at discrete times, kT.

The received communication signal is then received from the channel, and at least an in-phase baseband component signal ($Z_I(t)$ signal) is extracted therefrom. Next the $Z_I(t)$ signal is preferably lowpass filtered and oversampled the output of the lowpass filter with an analog-to-digital converter (ADC) at an oversampling rate $F_s = OS/T$, where $2 \leq OS \leq 8$ is an oversampling factor, and the ADC provides OS voltage samples for the $k^{th}$ symbol interval. During each $k^{th}$ symbol interval, using a $k^{th}$ set of the oversampled data samples that correspond to samples of the $Z_I(t)$ signal sampled during the $k^{th}$ symbol interval, a $k^{th}$ set of branch metrics are computed. Each branch metric provides a measure of a respective distance between the $k^{th}$ set of the oversampled data samples and a respective one of a set of template state transition signals ($x_{Template}(t, S_k, S_{k+1})$ signals) representative of each possible state transition from each possible first state $S_k = (Q_{k-1}, Q_{k-2}, \ldots Q_{K-L})$, to each second state $S_{k+1}(Q_k, Q_{k-1}, \ldots Q_{k-L+1})$, for each next permissible state $Q_k$ that can be transitioned to from the state $Q_{k-1}$. These branch metrics are then used by a trellis decoding algorithm to determine a trellis decoded sequence. The trellis decoded sequence is then used to derive an estimate of the binary data sequence.

In one preferred type of embodiment, the $m_1(t)$ signal corresponds to $m_1(t) = A \cos(\alpha_1(t))$, where A is a real number and $\alpha_1(t)$ is a continuous phase modulation (CPM) phase function.

In many preferred embodiments, the template state transition signal from the first state $S_k = (Q_{k-1}, Q_{k-2}, \ldots Q_{k-L})$ to each second state $S_{k+1} = (Q_k, Q_{k-1}, \ldots Q_{K-L+1})$, can be written as $$x_{Template}(t, S_k, S_{k+1}) = \sum_{j=1}^{L+1} p_{Q_{(k-j+1)},Q_{(k-j+2)}}(t - kT + jT - T),$$

for at least OS discrete sample times t in the $k^{th}$ symbol interval (kT≤t<(k+1)T). The branch metrics can be written as, $B(S_k, S_{k+1}) \cong \int_{kT}^{(k+1)T} [Z_I(t) - x_{Template}(t, S_k, S_{k+1})]^2 dt$. The inequality is in this equation due to the fact that the integral is digitally approximated and other simplifications can also be made to derive a sufficient statistic that has the key needed information. In practice, a set of correlations between the $Z_I(t)$ signal and a set of signal segments of the form $\{p_{Q_{(k-j+1)},Q_{(k-j+2)}}(t-kT+jT-T)$ for j=1, … L+1, and kT≤t<(k+1)T$\}$ are computed. The correlations are then reused multiple times to efficiently compute different ones of the branch metrics in the $k^{th}$ set of branch metrics. In preferred embodiments, the trellis decoding algorithm is a Viterbi algorithm or some variation thereof.

In some embodiments the receiver performs quadrature demultiplexing and also recovers OS voltage samples of a $Z_Q(t)$ signal during the $k^{th}$ symbol interval, where the $Z_Q(t)$ signal is a received version of an $x_Q(t)$ that has been encoded similarly to the $x_I(t)$ signal, but based upon a second real-valued baseband message signal ($m_2(t)$ signal) follows a second trajectory through the amplitude trellis that is determined in accordance with a second binary data sequence. A second trellis decoder is used to determine a second trellis decoded data sequence, and an estimate of the second binary data sequence is derived therefrom.

In PAM/QAM type embodiments, a communications receiver is adapted to process a received communication signal that is a channel-distorted version of a communication signal that has been sent by a CPS-PAM/QAM type transmitter as discussed above. The channel distortion can involve a linear channel model, some nonlinear distortion, and additive or multiplicative noise, for example. The received signal includes at least an in-phase component signal ($x_I(t)$ signal). The $x_I(t)$ signal can be written as:

$$x_I(t) = \sum_{j=1}^{L+1} a_{k-j+1} p(t - kT + jT - T),$$

for at least a two discrete sample where the variables are described as above. Note that $\{a_k\}$ is an M-ary pulse amplitude modulated sequence that has been generated in accordance with a binary data sequence, where $M \geq 2$, $p(t) = z(t) \otimes h(t)$ is a compact pulse shape whose length is no longer than (L+1)T, z(t) is a baseband pulse shape with a pulse width that is no longer than T, and h(t) is a finite impulse response filter whose impulse response has a length no longer than LT. The received communication signal is received from the channel and at least an in-phase baseband component signal ($Z_I(t)$ signal) is extracted therefrom. The $Z_I(t)$ signal is preferably lowpass filtered and oversampled with an analog-to-digital converter (ADC) at an oversampling rate $F_s=OS/T$, where $2 \leq OS \leq 8$ is an oversampling factor, and the ADC provides OS voltage samples for the $k^{th}$ symbol interval. For the $k^{th}$ symbol interval, a $k^{th}$ set of the oversampled data samples that corresponds to samples of the $Z_I(t)$ signal sampled during the $k^{th}$ symbol interval are used to compute a $k^{th}$ set of branch metrics. Each branch metric provides a measure of a respective distance between the $k^{th}$ set of the oversampled data samples and a respective one of a set of template state transition signals ($x_{Template}(t, S_k, S_{k+1})$ signals) representative of each possible state transition from each possible first state $S_k=(a_{k-1}, a_{k-2}, \ldots a_{k-L})$, to each second state $S_{k+1}=(a_k, a_{k-1}, \ldots a_{k-L+1})$, for each next permissible pulse amplitude modulated symbol, $a_k$. The branch metrics are then used by a trellis decoding algorithm to determine a trellis decoded sequence. An estimate of the binary data sequence is then derived from the trellis decoded sequence, for example via an inverse mapping from $a_k$ to a corresponding subsequence of source or coded bits, $I_k$.

In a preferred embodiment, the template state transition signal from the first state $S_k=(a_{k-1}, a_{k-2}, \ldots a_{k-L})$ to the second state $S_{k+1}=(a_k, a_{k-1}, \ldots a_{k-L+1})$ can be written as $$x_{Template}(t, S_k, S_{k+1}) = \sum_{j=1}^{L+1} a_{k-j+1} p(t - kT + jT - T),$$

for at least OS discrete sample times t in the $k^{th}$ symbol interval ($kT \leq t < (k+1)T$). The respective branch metrics are respective estimates of the respective distance defined by $$B(S_k, S_{k+1}) \cong \int_{kT}^{(k+1)T} [Z_I(t) - x_{Template}(t, S_k, S_{k+1})]^2 dt.$$

The inequality is due to digital approximation of the integral and the ability to use a sufficient statistic that contains the useful information in this distance measure. As discussed above, a set of correlations between the $Z_I(t)$ signal and a set of signal segments of the form $\{p(t-kT+jT-T)$ for $j=1, \ldots L+1$, and $kT \leq t < (k+1)T\}$ can be computed and reused many times to efficiently compute different ones of the branch metrics in the $k^{th}$ set of branch metrics. The trellis decoding algorithm is typically the Viterbi algorithm or a variant thereof to compute maximum likelihood sequence estimation or a suboptimal approximation thereof.

Depending on the embodiment, $x_I(t)$ signal can be transmitted at baseband, or can be amplitude modulated onto an in-phase carrier (using, for example, carrier suppressed double sideband), or can be sent on an in-phase carrier along with a second signal, $x_Q(t)$, where $$x_Q(t) = \sum_{j=1}^{L+1} b_{k-j+1} p(t - kT + jT - T),$$

where $\{b_k\}$ is a second M-ary pulse amplitude modulated sequence that has been generated in accordance with a second binary data sequence. The second signal is quadrature multiplexed and sent along with the $x_I(t)$ signal. Any such signals can be used to generate the communication signal that is received as the received communication signal. When two signals are quadrature multiplex, for the $x_I(t)$ signal, the template state transition signal from the first state $S_k=(a_{k-1}, a_{k-2}, \ldots a_{k-L})$ to the second state $S_{k+1}=(a_k, a_{k-1}, \ldots a_{k-L+1})$ can be written as $$x_{Template}(t, S_k, S_{k+1}) = \sum_{j=1}^{L+1} a_{k-j+1} p(t - kT + jT - T),$$

for at least OS discrete sample times t in the $k^{th}$ symbol interval ($kT \leq t < (k+1)T$) and for the $x_Q(t)$ signal, the template state transition signal from a first state $\beta_k=(b_{k-1}, b_{k-2}, \ldots b_{k-L})$, to a second state $\beta_{k+1}=(b_k, b_{k-1}, \ldots b_{k-L+1})$, that is, $$x_{Template}(t, \beta_k, \beta_{k+1}) = \sum_{j=1}^{L+1} b_{k-j+1} p(t - kT + jT - T),$$

for at least OS discrete sample times t in the $k^{th}$ symbol interval ($kT \leq t < (k+1)T$).

Figure 13:
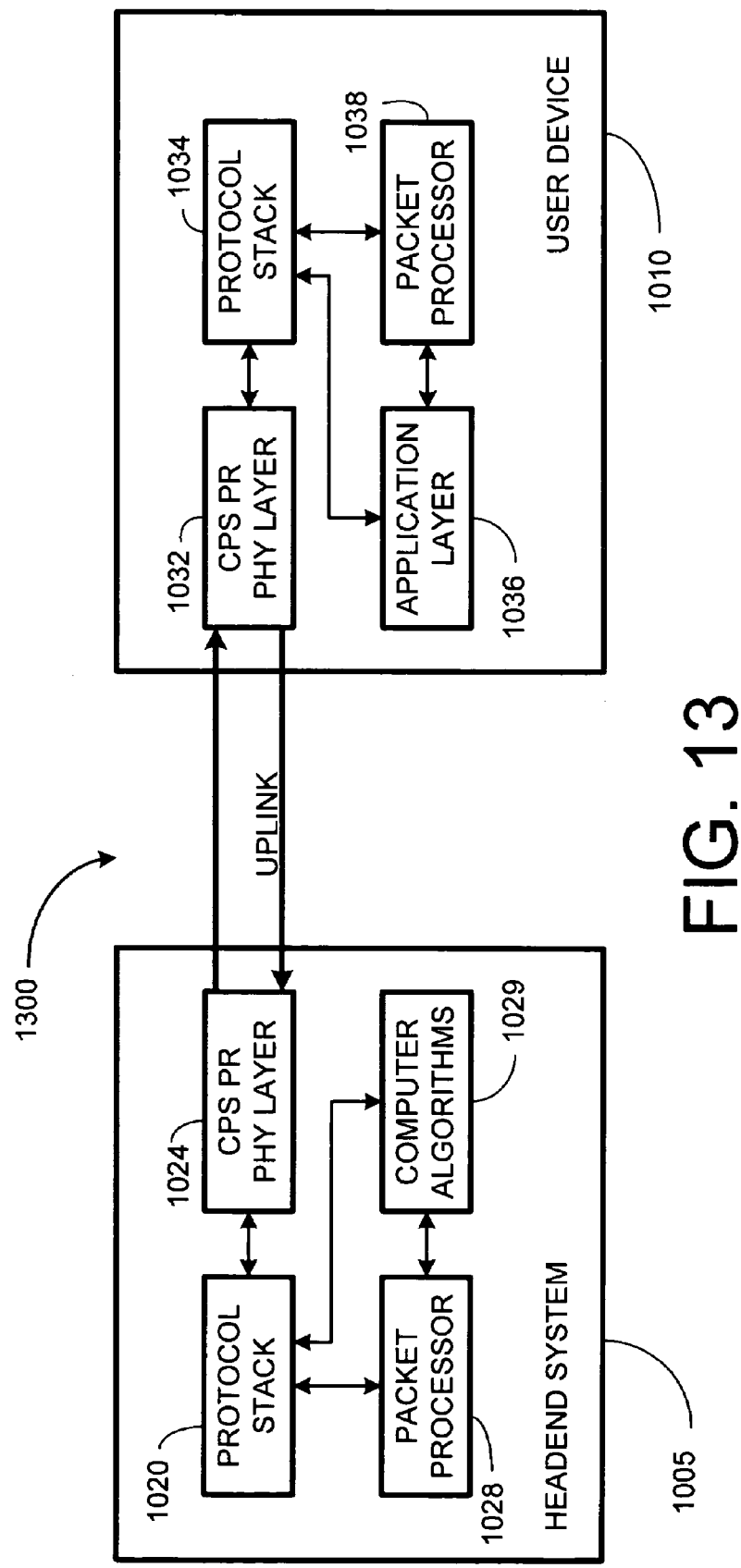
FIG. 13 is a block diagram that shows an exemplary communication system embodiment of the present invention.

FIG. 13 shows a higher level systems, architecture 1000 into which any of the SSB-FM techniques described herein may be used. A headend system 1005 transmits via a downlink channel to user device 1010. The user device 1010 transmits back to the headend system 1005 via an uplink channel. The headend system comprises a protocol stack 1020 which includes a physical layer 1024. The headend system also may include a control and routing module 1028 to connect to external networks, databases, and the like. The headend system also contains a computer control module 1029 which comprises processing power coupled to memory. The computer control module 1029 preferably implements any maintenance functions, service provisioning and resource allocation, auto-configuration, software patch downloading and protocol version software downloads, billing, local databases, web page interfaces, upper layer protocol support, subscriber records, and the like.

The user terminal 1010 similarly includes a physical layer interface 1032, a protocol stack 1034 and an application layer module 1036 which may include user interface devices as well as application software. The user terminal 1010 also may optionally include a packet processor 1038 which can be connected to a local area network, for example. The user 1010 terminal may also act as an IP switching node or router in addition to user functions in some embodiments.

Another type of embodiment replaces the headend system 1005 with another user device 1010 in which case direct peer-to-peer communications is enabled. In many applications, though, the headend can act as an intermediary between two user devices to enable indirect peer-to-peer communications using the same headend-to/from-user device uplink/downlink architecture illustrated in FIG. 13.

In preferred embodiments of the present invention, at least one of the uplink and the downlink channels is implemented using one or more of the CPS family of modulation schemes (CPS PR QM-MSK, CPS PR QM-CPM, CPS PR MA-QM-MSK, CPS PR MA-QM-CPM or CPS PR PAM/QAM. For example, the transmitter and receiver structures such as described with FIGS. 1, 2, 7A and 7B may be used to implement one or both of the physical layer interfaces 1024, 1032. The physical layer may also include trellis coded modulation versions of any of the CPS PR modulation schemes described. In some types of embodiments, the PHYS 1024, 1032 may include echo cancellation, cross-talk cancellation, equalization, and other forms of signal conditioning or receiver pre-processing. Also, the data sequences, $I_k$ and $J_k$ can themselves be chipped sequences that result by pointwise multiplying bipolar data sequences by bipolar spread spectrum pseudorandom noise type sequences. The chipped sequences are then processed using the CPS PR pulse shaping and decoding in similarly to the above-described embodiments. For example, this would correspond to the CDMA mode in the DOCSIS 2.0 specification. Likewise, the present invention could be used without spreading, for example in the TDMA mode of the DOCSIS 2.0 specification. Also, the physical layer channel could be wireless or wireline, depending on the embodiment.

Although the present invention has been described with reference to specific embodiments, other embodiments may occur to those skilled in the art without deviating from the intended scope. For example, other compact pulse shaping filter impulse responses beside (6) could be used. The pulse shaping could be applied to both TDMA and CDMA signals that both currently use RC pulse shaping such as defined in the DOCSIS 2.0 cable modem specification. Also, CPS PR signaling can be used in place of PRML in magnetic recording applications. Both baseband and passband CPS PR signals can be transmitted and received and decoded. Also, pre-equalization or equalization or other types of signal conditioning can be cascaded and used with the present invention. Hence it is noted that all such embodiments and variations are contemplated by the present invention.

What we claim is:

1. A method for use in a communications receiver that is adapted to process a received communication signal, wherein the received communication signal provides a channel-distorted version of a communication signal that has been encoded in accordance with at least an in-phase component signal ($x_I(t)$ signal), wherein $$x_I(t) = \sum_{j=1}^{L+1} p_{Q_{(k-j+1)}, Q_{(k-j+2)}}(t - kT + jT - T),$$

for at least two discrete sample times, t, in each of a plurality of symbol intervals, including a $k^{th}$ symbol interval ($kT \leq t < (k+1)T$), where L is a positive integer and $L \leq 7$, T is a symbol interval duration, k and j are integer counting variables, $p_{Q_{(k-j+1)}, Q_{(k-j+2)}}(t) = m_{Q_{(k-j+1)}, Q_{(k-j+2)}}(t) \otimes h(t)$ is a compact pulse shape whose length is no longer than (L+1)T, h(t) is a finite impulse response filter whose impulse response has a length no longer than LT, $m_{Q_{(k-j+1)}, Q_{(k-j+2)}}(t)$ is a state transition signal of a first real-valued baseband message signal ($m_I(t)$ signal) from a state Q(k−j+1) to a state Q(k−j+2), the $m_1(t)$ signal follows a first trajectory through an amplitude trellis in accordance with a binary data sequence that has been trellis encoded therein, and the first trajectory passes through a first particular sequence of trellis states, $Q_0, Q_1, \ldots Q_k$, at discrete times, kT, the method comprising:

receiving the received communication signal from a channel, extracting at least an in-phase baseband component signal ($Z_I(t)$ signal) therefrom, lowpass filtering the $Z_I(t)$ signal, and oversampling the output of the lowpass filtering with an analog-to-digital converter (ADC) at an oversampling rate $F_s = OS/T$, where $2 \leq OS \leq 8$ is an oversampling factor, and the ADC provides OS voltage samples for the $k^{th}$ symbol interval;

computing, for the $k^{th}$ symbol interval, using a $k^{th}$ set of the oversampled data samples that correspond to samples of the $Z_I(t)$ signal sampled during the $k^{th}$ symbol interval, a $k^{th}$ set of branch metrics, wherein each branch metric provides a measure of a respective distance between the $k^{th}$ set of the oversampled data samples and a respective one of a set of template state transition signals ($x_{Template}(t, S_k, S_{k+1})$ signals) representative of each possible state transition from each possible first state $S_k = (Q_{k-1}, Q_{k-2}, \ldots Q_{k-L})$, to each second state $S_{k+1}(Q_k, Q_{k-1}, \ldots Q_{k-L+1})$ for each next permissible state $Q_k$ that can be transitioned to from the state $Q_{k-1}$; and implementing a trellis decoding algorithm using at least the $k^{th}$ set of branch metrics to determine a trellis decoded sequence and deriving an estimate of the binary data sequence based upon the trellis decoded sequence.

2. The method of claim 1, wherein the $m_1(t)$ signal corresponds to $m_1(t) = A \cos(\alpha_1(t))$, where A is a real number and $\alpha_1(t)$ is a continuous phase modulation (CPM) phase function.

3. The method of claim 1, wherein the template state transition signal from the first state $S_k(Q_{k-1}, Q_{k-2}, \ldots Q_{k-L})$, to each second state $S_{k+1} = (Q_k, Q_{k-1}, \ldots Q_{k-L+1})$, can be written as $$x_{Template}(t, S_k, S_{k+1}) = \sum_{j=1}^{L+1} p_{Q_{(k-j+1)}, Q_{(k-j+2)}}(t - kT + jT - T),$$

for at least OS discrete sample times t in the $k^{th}$ symbol interval ($kT \leq t < (k+1)T$).

4. The method of claim 3, wherein respective ones of the $k^{th}$ set of branch metrics are respective estimates of a respective distance defined by:

$$B(S_k, S_{k+1}) \cong \int_{kT}^{(k+1)T} [Z_I(t) - x_{Template}(t, S_k, S_{k+1})]^2 dt.$$

5. The method of claim 3, further comprising:
computing a set of correlations between the $Z_I(t)$ signal and a set of signal segments of the form $\{p_{Q_{(k-j+1)}, Q_{(k-j+2)}}(t - kT + jT - T)$ for j=1, ... L+1, and $kT \leq t < (k+1)T\}$;
wherein the set of correlations are reused multiple times to efficiently compute different ones of the branch metrics in the $k^{th}$ set of branch metrics.

6. The method of claim 1, wherein the trellis decoding algorithm is a Viterbi algorithm.

7. The method of claim 1, further comprising:
amplitude demodulating the received communication signal to translate an in-phase carrier component signal to baseband;
wherein the extracting is performed after the amplitude demodulating.

8. The method of claim 1, further comprising:
quadrature demodulating the received communication signal to translate both an in-phase carrier component signal and a quadrature-phase carrier signal to baseband, wherein the extracting of the $Z_I(t)$ signal occurs after the quadrature demodulating; and
extracting at least a quadrature-phase baseband component signal ($Z_Q(t)$ signal) to after the quadrature demodulating, lowpass filtering the $Z_Q(t)$ signal, and oversampling the output of the lowpass filtering with a second ADC at the oversampling rate $F_s$ to provide OS voltage samples of the $Z_Q(t)$ signal for the $k^{th}$ symbol interval, wherein the $Z_Q(t)$ signal is a received version of an $x_Q(t)$ that has been encoded similarly to the $x_I(t)$ signal, but based upon a second real-valued baseband message signal ($m_2(t)$ signal) follows a second trajectory through the amplitude trellis that is determined in accordance with a second binary data sequence.

9. The method of claim 8, further comprising:
computing, for the $k^{th}$ symbol interval, using a $k^{th}$ set of the oversampled data samples that correspond to samples of the $Z_Q(t)$ signal sampled during the $k^{th}$ symbol interval, a second $k^{th}$ set of branch metrics which measure a respective distance between the $k^{th}$ set of the oversampled data samples of the $Z_Q(t)$ signal and each of the set of template state transition signals; and
implementing a trellis decoding algorithm using at least the second $k^{th}$ set of branch metrics to determine a trellis decoded data sequence, and deriving an estimate of the second binary data sequence therefrom.

10. The method of claim 9, wherein:
the template state transition signal from the first state the template state transition signal from the first state $S_k(Q_{k-1}, Q_{k-2}, \ldots Q_{k-L})$, to each second state $S_{k+1}=(Q_k, Q_{k-1}, \ldots Q_{k-L+1})$, can be written as $$x_{Template}(t, S_k, S_{k+1}) = \sum_{j=1}^{L+1} p_{Q_{(k-j+1)}, Q_{(k-j+2)}}(t - kT + jT - T),$$

for at least OS discrete sample times t in the $k^{th}$ symbol interval ($kT \leq t < (k+1)T$).

11. The method of claim 1, wherein L=4.
12. The method of claim 1, wherein L=3.
13. The method of claim 1, wherein L=2.
14. The method of claim 1, wherein L=1.
15. The method of claim 1, wherein, when a set of real numbers, $t_0$, $t_a$, $t_b$ and $\alpha$ are defined as $t_a = \alpha T/2$, $t_b = (LT - t_a)$, and $\alpha = t_0/T$, the h(t) can be written in the form:

$$h(t) = \begin{cases} \frac{1}{2}\left[1 - \cos\left(\frac{\pi(t - t_a)}{t_a}\right)\right], & 0 \leq t < t_0 \\ 1, & t_0 \leq t < (L-\alpha)T \\ \frac{1}{2}\left[1 + \cos\left(\frac{\pi(t - t_b)}{t_a}\right)\right], & LT - t_0 \leq t < LT \\ 0, & \text{otherwise} \end{cases}.$$

16. A method for use in a communications receiver that is adapted to process a received communication signal, wherein the received communication signal provides a channel-distorted version of a communication signal that has been encoded in accordance with at least an in-phase component signal ($x_I(t)$ signal), wherein $$x_I(t) = \sum_{j=1}^{L+1} a_{k-j+1} p(t - kT + jT - T),$$

for at least a two discrete sample times t in each of a plurality of symbol intervals, including a $k^{th}$ symbol interval ($kT \leq t < (k+1)T$), where T is a symbol interval duration, k is an integer counting variable, L is a positive integer and $L \leq 7$, $\{a_k\}$ is an M-ary pulse amplitude modulated sequence that has been generated in accordance with a binary data sequence, where $M \geq 2$, $p(t) = z(t) \otimes h(t)$ is a compact pulse shape whose length is no longer than $(L+1)T$, $z(t)$ is a baseband pulse shape with a pulse width that is no longer than T, and h(t) is a finite impulse response filter whose impulse response has a length no longer than LT, the method comprising:
receiving the received communication signal from a channel, extracting at least an in-phase baseband component signal ($Z_I(t)$ signal) therefrom, lowpass filtering the $Z_I(t)$ signal, and oversampling the output of the lowpass filtering with an analog-to-digital converter (ADC) at an oversampling rate $F_s = OS/T$, where $2 \leq OS \leq 8$ is an oversampling factor, and the ADC provides OS voltage samples for the $k^{th}$ symbol interval;
computing, for the $k^{th}$ symbol interval, using a $k^{th}$ set of the oversampled data samples that correspond to samples of the $Z_I(t)$ signal sampled during the $k^{th}$ symbol interval, a $k^{th}$ set of branch metrics, wherein each branch metric provides a measure of a respective distance between the $k^{th}$ set of the oversampled data samples and a respective one of a set of template state transition signals ($x_{Template}(t, S_k, S_{k+1})$ signals) representative of each possible state transition from each possible first state $S_k = (a_{k-1}, a_{k-2}, \ldots a_{k-L})$, to each second state $S_{k+1} = (a_k, a_{k-1}, \ldots a_{k-L+1})$, for each next permissible pulse amplitude modulated symbol, $a_k$; and
implementing a trellis decoding algorithm using at least the $k^{th}$ set of branch metrics to determine a trellis decoded sequence and deriving an estimate of the binary data sequence based upon the trellis decoded sequence.

17. The method of claim 16, wherein the template state transition signal from the first state $S_k = (a_{k-1}, a_{k-2}, \ldots a_{k-L})$ to the second state $S_{k+1} = (a_k, a_{k-1}, \ldots a_{k-L+1})$ can be written as $$x_{Template}(t, S_k, S_{k+1}) = \sum_{j=1}^{L+1} a_{k-j+1} p(t - kT + jT - T),$$

for at least OS discrete sample times t in the $k^{th}$ symbol interval ($kT \leq t < (k+1)T$).

18. The method of claim 17, wherein the respective branch metrics are respective estimates of the respective distance defined by:

$$B(S_k, S_{k+1}) \cong \int_{kT}^{(k+1)T} [Z_I(t) - x_{Template}(t, S_k, S_{k+1})]^2 dt.$$

19. The method of claim 17, further comprising:
computing a set of correlations between the $Z_I(t)$ signal and a set of signal segments of the form $\{p(t-kT+jT-T)$ for $j=1, \ldots L+1$, and $kT \leq t < (k+1)T\}$;
wherein the set of correlations are reused multiple times to efficiently compute different ones of the branch metrics in the $k^{th}$ set of branch metrics.

20. The method of claim 16, wherein the trellis decoding algorithm is a Viterbi algorithm.

21. The method of claim 16, further comprising:
amplitude demodulating the received communication signal to translate an in-phase carrier component signal to baseband;
wherein the extracting is performed after the amplitude demodulating.

22. The method of claim 16, further comprising:
quadrature demodulating the received communication signal to translate both an in-phase carrier component signal and a quadrature-phase carrier signal to baseband, wherein the extracting of the $Z_I(t)$ signal occurs after the quadrature demodulating; and extracting at least a quadrature-phase baseband component signal ($Z_Q(t)$ signal) after the quadrature demodulating, lowpass filtering the $Z_Q(t)$ signal, and oversampling the output of the lowpass filtering with a second ADC at the oversampling rate $F_s$ to provide OS voltage samples of the $Z_Q(t)$ signal for the $k^{th}$ symbol interval, wherein the $Z_Q(t)$ signal is a received version of an $x_Q(t)$ that has been encoded according to $$x_Q(t) = \sum_{j=1}^{L+1} b_{k-j+1} p(t - kT + jT - T),$$

where $\{b_k\}$ is a second M-ary pulse amplitude modulated sequence that has been generated in accordance with a second binary data sequence.

23. The method of claim 22, further comprising:

computing, for the $k^{th}$ symbol interval, using a second $k^{th}$ set of the oversampled data samples that correspond to samples of the $Z_Q(t)$ signal sampled during the $k^{th}$ symbol interval, a second $k^{th}$ set of branch metrics which measure a respective distance between the second $k^{th}$ set of the oversampled data samples and each of the set of template state transition signals; and implementing the trellis decoding algorithm using at least the second $k^{th}$ set of branch metrics to determine a second trellis decoded sequence and deriving an estimate of the second binary data sequence based upon the second trellis decoded sequence.

24. The method of claim 23, wherein:

the template state transition signal from the first state $S_k=(a_{k-1}, a_{k-2}, \ldots a_{k-L})$ to the second state $S_{k+1}=(a_k, a_{k-1}, \ldots a_{k-L+1})$ can be written as $$x_{Template}(t, S_k, S_{k+1}) = \sum_{j=1}^{L+1} a_{k-j+1} p(t - kT + jT - T),$$

for at least OS discrete sample times t in the $k^{th}$ symbol interval ($kT \leq t < (k+1)T$); and the template state transition signal from a first state $\beta_k = (b_{k-1}, b_{k-2}, \ldots b_{k-L})$, to a second state $\beta_{k+1} = (b_k, b_{k-1}, \ldots b_{k-L+1})$ can be written as $$x_{Template}(t, \beta_k, \beta_{k+1}) = \sum_{j=1}^{L+1} b_{k-j+1} p(t - kT + jT - T),$$

for at least OS discrete sample times t in the $k^{th}$ symbol interval ($kT \leq t < (k+1)T$).

25. The method of claim 16, wherein L=4.
26. The method of claim 16, wherein L=3.
27. The method of claim 16, wherein L=2.
28. The method of claim 16, wherein L=1.
29. The method of claim 16, wherein, when a set of real numbers, $t_0$, $t_a$, $t_b$ and $\alpha$ are defined as $t_a=\alpha T/2$, $t_b=(LT-t_a)$, and $\alpha=t_0/T$, the h(t) can be written in the form:

$$h(t) = \begin{cases} \frac{1}{2}\left[1 - \cos\left(\frac{\pi(t-t_a)}{t_a}\right)\right], & 0 \leq t < t_0 \\ 1, & t_0 \leq t < (L-\alpha)T \\ \frac{1}{2}\left[1 + \cos\left(\frac{\pi(t-t_b)}{t_a}\right)\right], & LT - t_0 \leq t < LT \\ 0, & \text{otherwise} \end{cases}.$$

* * * * *